United States Patent
Chaudhry et al.

(10) Patent No.: US 11,151,134 B2
(45) Date of Patent: Oct. 19, 2021

(54) METHOD AND SYSTEM FOR EFFICIENT PROCESSING OF POLYMORPHIC TABLE FUNCTIONS

(71) Applicant: ORACLE INTERNATIONAL CORPORATION, Redwood Shores, CA (US)

(72) Inventors: Atif Chaudhry, Pleasanton, CA (US); Lei Sheng, Redwood City, CA (US); Shashaanka Agrawal, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 116 days.

(21) Appl. No.: 16/007,777

(22) Filed: Jun. 13, 2018

(65) Prior Publication Data

US 2019/0102426 A1 Apr. 4, 2019

Related U.S. Application Data

(60) Provisional application No. 62/566,404, filed on Sep. 30, 2017.

(51) Int. Cl.
*G06F 16/00* (2019.01)
*G06F 16/2453* (2019.01)

(52) U.S. Cl.
CPC .. *G06F 16/24537* (2019.01); *G06F 16/24547* (2019.01)

(58) Field of Classification Search
CPC ............... G06F 16/24537; G06F 16/24547
See application file for complete search history.

(56) References Cited

U.S. PATENT DOCUMENTS

| | | | |
|---|---|---|---|
| 5,960,426 A * | 9/1999 | Pirahesh | G06F 16/235 |
| 2005/0289125 A1* | 12/2005 | Liu | G06F 16/2448 |
| 2013/0138626 A1* | 5/2013 | Delafranier | G06F 16/2453 |
| | | | 707/713 |
| 2015/0120699 A1* | 4/2015 | Faerber | G06F 16/24542 |
| | | | 707/718 |
| 2015/0220597 A1* | 8/2015 | Simhadri | G06F 16/24534 |
| | | | 707/797 |

OTHER PUBLICATIONS

SAP, "User-Defined Functions", SAP Help Portal, SAP IQ | 16.1 SP01 PL00-PL08, (Dec. 20, 2018).

* cited by examiner

*Primary Examiner* — Diedra McQuitery
(74) *Attorney, Agent, or Firm* — Vista IP Law Group, LLP

(57) ABSTRACT

Described is an approach for performing an efficient processing of table functions/polymorphic table functions. The approach does not create additional cursors for processing a table or polymorphic table function invoked within a SQL statement. Instead, the approach handles the SQL statement that invokes the table/polymorphic table function as a single cursor.

46 Claims, 17 Drawing Sheets

"view_2"
select deptno, empno, sal, hiredate, max_sal
from output structure
where max_sal > 10
530b select deptno, empno, sal, hiredate, max_sal  — 505b
from Run_Max(emp order by hiredate partition by deptno, columns (sal))  — 510b
where deptno = 30 and max_sal > 10  — 515b 503b "view_1"
select deptno, empno, sal, hiredate
from emp
partition by deptno
where deptno = 30
520b

FIG. 5B

"view_2"
select <pass-through cols>, max_sal
from output structure

530c with T as (select * from emp, dept where e.deptno = d.deptno) — 505c
select * — 510c
from Run_Max(T ..., columns (max_sal)) — 515c 503c "view_1"
select *
from T 520c

FIG. 5C

METHOD AND SYSTEM FOR EFFICIENT PROCESSING OF POLYMORPHIC TABLE FUNCTIONS

CROSS REFERENCE TO RELATED APPLICATIONS

The present application claims the benefit under 35 U.S.C. § 119 to U.S. Provisional Patent Application Ser. No. 62/566,404 filed Sep. 30, 2017, entitled, "METHOD AND SYSTEM FOR EFFICIENT PROCESSING OF POLYMORPHIC TABLE FUNCTIONS," which is hereby incorporated by reference in its entirety.

FIELD

This disclosure concerns a method, a computer program product, and a computer system for performing an efficient processing of polymorphic table functions.

BACKGROUND

A table function (TF) is a function that returns a collection of rows. A TF can perform transformations to data before the data is returned as a collection of rows. When used for creating database queries, a TF can be included in the "FROM" clause of a SQL query block such that the creator of the query can refer to the TF as if it is a persisted table in a database. Under the covers, the TF is processed by the database system to implement the function on one or more input sources to generate outputs in the form of table rows that can then be consumed by query execution processing.

Normally, a TF is configured to operate in a dedicated manner only upon specifically identified input sources, where the "function" for the TF knows the exact format of that input source, and can act upon that specific source to produce a pre-determined output format. However, the limitation of TFs to only operate upon pre-defined inputs sources is inefficient if the processing by the TF is really needed for multiple types of input sources, and it is not desired to create a separate TF for each and every input source type. Therefore, polymorphic table functions (PTFs) have been developed, which are a type of TF whose inputs and outputs are determined by the arguments sent to the PTF upon invocation of the PTF. A PTF may be polymorphic in its input, output, or both. In other words, the identity and/or structure of the input(s) may be unknown, and/or the structure of the output may also be unknown until the PTF is invoked and arguments are sent to the PTF.

Similar to TFs, a PTF can be called from the FROM clause of a SQL query block. The SQL statement that includes the PTF may have the following form:
SELECT column_1, column_2, . . .
FROM PTF(set_of_PTF_arguments)
WHERE predicate_1, predicate_2, . . . ;
In this example SQL statement, the "SELECT" term indicates that the statement is querying for certain columns to be provided as a result set (e.g., column_1, column_2, . . . ). The "FROM" term indicates that the source of the data from which the columns are to be retrieved is the PTF, where certain arguments/parameters are included for processing the PTF. The "WHERE" term identifies one or more predicates that may be applied to process, filter, and/or otherwise manipulate the set of data to be placed into the result set.

Conventionally, when processing a SQL statement having a PTF as described in the previous paragraph, database systems will create at least two cursors, where a first cursor is created to process the outer "SELECT" statement, and a second cursor is created to process the inner PTF function. In the database context, a "cursor" refers to a control structure created by the database system to process some work. The cursor creation process normally involves some type of parsing over the database statement, followed by creation of an execution plan that is optimized taking into account the source/type/characteristics of data being accessed (e.g., size/location/statistics of a table) and/or whether there are any ancillary structures/processing that may be useful to make the statement execution more efficient (e.g., using indexes, partitioning, etc.).

The problem is that because two cursors are required, where the first cursor corresponds to the outer SELECT statement and the second cursor corresponds to the inner PTF, the separate optimization processing that is applied individually for each cursor may not result in overall execution plans that are "optimal". For example, consider the situation where the inner PTF needs to process a very large amount of data to generate a set of rows for the outer SELECT statement. When optimized in isolation, the specific cursor for the inner PTF will not be able to create an execution plan that could take into account certain aspects (e.g., predicates) from the outer SELECT statement that may be useful to make the inner execution plan more efficient (e.g., by reducing the amount of data to be processed/produced). This may result in excessive computational expense for execution of the inner PTF. In the other direction, this separation of cursors may also cause more rows than necessary to be provided to the outer SELECT for processing, which means that excessive computational expenses are also incurred for execution of the outer SELECT statement. In effect, global optimization suffers because each cursor is processed only for local optimization.

Therefore, there is a need for a method and/or system for processing SQL queries having polymorphic table functions more efficiently.

SUMMARY

According to some embodiments, described is an improved method, system, and computer program product that performs an efficient processing of polymorphic table functions. In some embodiments, the approach uses techniques for handling SQL statements that invoke polymorphic table functions as a single cursor instead of creating a separate cursor for the outer SELECT statement and a separate cursor for the polymorphic table function. This approach permits cross-optimizations to occur across both the outer SELECT statement and the inner PTF for a SQL statement.

Embodiments of the present disclosure provide a computer program product, a computer system, and a computer implemented method for performing a processing of a PTF including receiving a structured query language (SQL) statement including a polymorphic table function (PTF), identifying a definition of the PTF, identifying one or more predicates in the SQL statement, and optimizing processing of the PTF by applying the one or more predicates to the PTF.

Other additional objects, features, and advantages of the disclosure are described in the detailed description, figures, and claims.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope. The invention will be described and explained with additional specificity and detail through the use of the accompanying drawings in which:

FIGS. 5A-5C illustrate examples of views generated from a SQL statement invoking a polymorphic table function according to some embodiments of the present disclosure.

DETAILED DESCRIPTION

Figure 1:
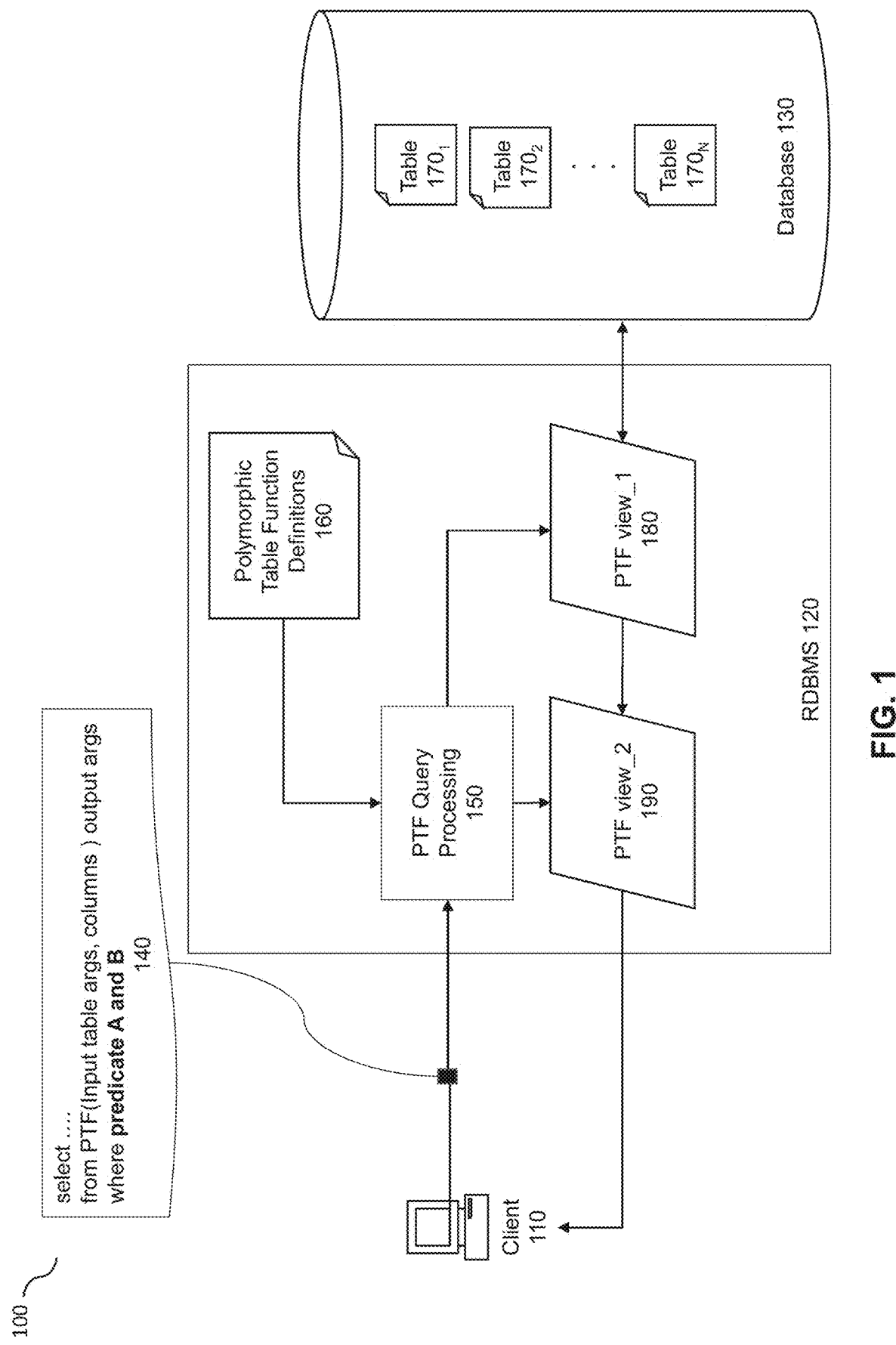
FIG. 1 illustrates a system for implementing polymorphic table functions according to some embodiments of the disclosure.

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As noted above, requiring two separate cursors to process a SQL statement having a PTF is problematic because this approach limits cross-optimizations between the outer SELECT and inner PTF that may to useful to execute the SQL statement more efficiently. For example, consider the situation where the inner PTF operates upon partitioned data, where the outer SELECT statement includes a predicate that may be useful to identify the specific partitions that would be needed by the inner PTF for processing. With two separate cursors having individualized optimization processing, the inner PTF would not be able to apply partition pruning based upon the predicates of the outer SELECT statement. This is very problematic because if the inner PTF needs to process a large amount of data collectively if all partitions are processed, then this inability to perform cross cursor optimizations to perform partition pruning to remove some of the partitions for processing based upon other information from the outer SELECT statement would cause an excessive amount of processing to be performed to execute the inner PTF.

In some embodiments, cross-optimizations between the outer SELECT statement and the inner PTF are implemented by using a single cursor to handle both the outer SELECT statement and the inner PTF. The way this is accomplished, in some embodiments, is by implementing multiple levels of view processing to process the outer SELECT statement and the inner PTF. Portions of the inner PTF may be rewritten as a view that runs within the outer SELECT statement to query the underlying tables. The view is compiled along with the outer SELECT statement into the same cursor of the outer SELECT statement without creating a separate cursor for the view or the PTF. Therefore, since the PTF and the SQL statement that invoked the PTF are executed within the same cursor, this allows optimizations to be applied to the inner PTF processing based upon predicates or other elements of the outer SELECT statement. For example, one or more predicates from the outer SELECT statement may be used and applied to implement partition pruning in the processing of the inner PTF for any table sources that are input to the PTF. For ease of explanation, this disclosure will disclose the implementation of a polymorphic table function. However, one of ordinary skill in the art may appreciate that a non-polymorphic table function (e.g., a table function) may be implemented in a similar fashion as a polymorphic table function. In other words, a single cursor may also be used to handle both the outer SELECT statement and the inner table function of a SQL statement that invokes a table function.

FIG. 1 illustrates a system for implementing a polymorphic table function according to some embodiments of the disclosure. System 100 includes at least a client 110, a relational database management system (RDBMS) 120 and a database 130. A client 110 may be a person (e.g., a query author), a computer program or application, etc. that generates SQL statements to be executed by a database system. A RDBMS 120 may be any relational database management system. Database 130 may be any type of database that is formed from one or more persistent storage devices. Database 130 may contain one or more tables 170 as depicted in FIG. 1.

The client 110 may generate a SQL statement 140 that invokes a PTF from within a FROM clause of the SQL statement 140. SQL statement 140 may also include a SELECT statement that selects columns that are of interest to the client 110. The columns identified in a SELECT statement of a SQL statement are typically columns within a table as defined in the FROM clause. However, when the FROM clause invokes a PTF, the PTF returns one or more rows (e.g., a table structure) that contains the data that is of interest to the SQL statement 140. Here, the SQL statement 140 includes two predicates A and/or B in its WHERE clause. However, in other embodiments, SQL statements of interest may include zero, one or many predicates. A WHERE clause in SQL specifies that a SQL statement should only affect rows that meet specified criteria. The criteria are expressed in the form of predicates. WHERE clauses are not mandatory clauses of SQL statements, but may be used to limit the number of rows affected by a SQL statement or returned by a query.

Predicates A and/or B are generally directed towards data that correspond to the SQL statement. However, since the SQL statement 140 invokes a PTF, predicate A and/or B may be directed to a query within the PTF or to the SQL statement 140 itself, depending on what predicates are being used and in some cases, which type of PTF is being invoked.

One significant advantage of allowing predicates, defined within the SQL statement 140 to be pushed through the PTF itself, is that predicates may reduce the amount of data that the RDBMS may need to be concerned with when providing input data to the PTF (e.g., partition pruning or merely reducing the number of rows that are retrieved from the database for the PTF). This reduction of rows may significantly reduce the amount of data kept in memory by the RDBMS while processing the PTF. This reduction of storage space in memory may also significantly improve the performance of the RDBMS itself by allowing other processes to access the memory that would have been used by the RDBMS having to retrieve an entire table into memory to process the PTF, as opposed to only those rows of data that are of concern to the PTF.

As discussed above, legacy systems cannot push predicates through the PTF to the underlying tables because legacy systems generate separate cursors for the PTF as opposed to processing the PTF in the SQL statement as one single cursor. Thus, legacy systems do not have the ability to leverage cross cursor optimizations such as passing predicates from the SQL statement 140 into the PTF. One of ordinary skill in the art may appreciate predicates are not required in the SQL statement 140 in order to leverage the efficiencies obtained for processing the PTF, according to some embodiments of the present disclosure. Predicates are just one example of how efficiencies may be obtained by the present disclosure. Other efficiencies may still be achieved such as projection pruning and minimizing data being transferred between the RDBMS and the PTF.

SQL statement 140 may be sent to RDBMS 120 for processing at PTF query processing 150. PTF query processing 150 may parse, perform semantic analysis, and/or optimize the SQL statement 140 to create one cursor for the entire SQL statement without creating a specific cursor for the PTF. The execution plan may include defining a first view (e.g., PTF view_1 180) on an input structure, the view comprising one or more predicates such that the one or more predicates are identified from a WHERE clause of the SQL statement. The execution plan may also include fetching data from the first view to compute one or more new columns, such that the fetching is performed by operators implemented by code that are received from a PTF definitions 160 having a PTF implementation package corresponding to the PTF. Furthermore, the execution plan may also include generating a data structure (not shown in FIG. 1) from pass-through columns from the input structure and the one or more new columns computed by the PTF, the data structure corresponding to a SELECT statement of the SQL statement and the one or more new columns computed by the PTF. Additionally, the execution plan may also include defining a second view (e.g., PTV view_2 190) on the output structure such that the second view includes one or more predicates from the SQL statement that are based at least in part on the one or more new columns computed.

The first view implemented on the input table/structure that may eliminate columns that are not needed by the SQL statement (e.g., projection pruning) and eliminate rows of data from the input table/structure of the PTF that are not needed by the SQL statement (e.g., partitioning, predicates, etc.). The output of the first view may be a data source for a function that fetches one or more rows from the first view and compute/calculate the results of the PTF at runtime, the computation/calculation being defined by a PTF author upon creation of the PTF. The results of the computation/calculation at runtime may produce new columns to be added to a data structure corresponding to the input table/structure of the first view such that the data structure includes one or more pass-through columns identified in the input table/structure from a combination of a list of columns from a SELECT statement of the SQL statement 140 and one or more new columns generated by the PTF as identified from the list of columns from the SELECT statement.

The second view (e.g., PTF view_2) may be implemented on the data structure to produce the final result set of the SQL statement 140 such that the second view may further filter data from the data structure based on at least in part on predicates from the SELECT statement of the SQL statement corresponding to the one or more new columns generated by the PTF.

Since SQL statement 140 includes an invocation of a PTF from within its FROM clause, PTF query processing 150 may inspect a polymorphic table function definition 160 to determine arguments that are required by the PTF. For example, the arguments may include an input table/structure name, arguments pertaining to the input table/structure, columns of the input/table structure, and an output argument that is produced as a result of the PTF. PTF query processing 150 may rely on the polymorphic table function definition 160 to provide the necessary information to determine the input structure for the PTF and the output structure of the output provided by the PTF. Additionally, the argument identifying the input table/structure name received from the SQL statement may be used by the PTF query processing 150 to query a data dictionary of the RDBMS to ascertain the actual structure definition of the input table/structure.

For purposes of ease of explanation, the input argument of a table/structure are described as an input table/structure, but one of ordinary skill in the art may appreciate that the input arguments do not have to be tables. The input arguments may be other types of input data sources and therefore, the arguments are really what the input data sources are for the PTF. Furthermore, the output argument of the PTF may be one or more rows. However, the remainder of this disclosure may refer to the input argument of the PTF as an input table or the output of the PTF as an output table, but one of ordinary skill in the art may appreciate the input argument into the PTF may be other types of input data sources and the output argument of the PTF may be one or more rows (e.g., output structure), but may not necessarily be a persisted table.

During processing of the SQL statement 140, the PTF query processing 150 may know which input table/structure, arguments of the table/structure and columns (if any) are specified in the SQL statement 140 invoking the PTF. PTF query processing 150 may also determine the output table/structure resulting from the PTF by identifying the input table/structure from the argument received, identifying the structure of the input table/structure corresponding to the input table/structure argument received by inspecting a data dictionary library of the RDBMS, identifying columns from the SELECT statement to avoid passing certain columns from the input table/structure into the PTF that are not included in the SELECT statement, and identifying any new columns resulting from the PTF that are included in the SELECT statement.

Once the PTF query processing 150 determines the structure of the input and the structure of the output table/structure resulting from the PTF, the PTF query processing 150 may transform the SQL statement into one or more views. PTF query processing 150 may generate an execution plan defining a PTF view_1 180 that corresponds to an input table defined at least in part by the PTF invocation arguments and in some cases, some portions of SQL statement 140 (e.g., predicates). In some embodiments, PTF view_1 180 may include predicate A from SQL statement 140 that may further reduce the number of rows that is returned to the PTF view_1 180.

Additionally, the PTF query processing 150 may also generate, in the same execution plan, a definition of PTF view_2 190 that corresponds to the SELECT statement of the SQL statement 140. In some embodiments, a PTF may not return any new columns, depending on the PTF. In such embodiments, PTF view_2 190 may contain a similar structure as the PTF view_1 180. However, in some embodiments, the PTF may return one or more new columns. In such embodiments, the PTF view_2 190 may comprise columns from PTF view_1 plus any new columns identified in the SELECT statement of the SQL statement 140.

The PTF view_1 180 may query data from one or more tables 170 from database 130. The data returned to the PTF view_1 180 may comprise the input data that the PTF may use to process its computation/calculation (e.g., to provide results which may include new column values, if applicable).

Results from the PTF processing may provide a table/structure having data that PTF view_2 190 may query upon to return to the client 110 a result set from executing the SQL statement 140. The PTF view_1 180 and the PTF view_2 190 may be designated as non-mergeable views. Generally, views may be mergeable and data from one view may be merged or collapsed with data from another view. However, the present disclosure may indicate the PTF view_1 180 and the PTV view_2 190 as non-mergeable views because the particular implementation of these views for processing the PTF require that view_1 180 and view_2 190 are non-mergeable views to maintain its structural integrity for processing the SQL statement 140 invoking the PTF.

Figure 2:
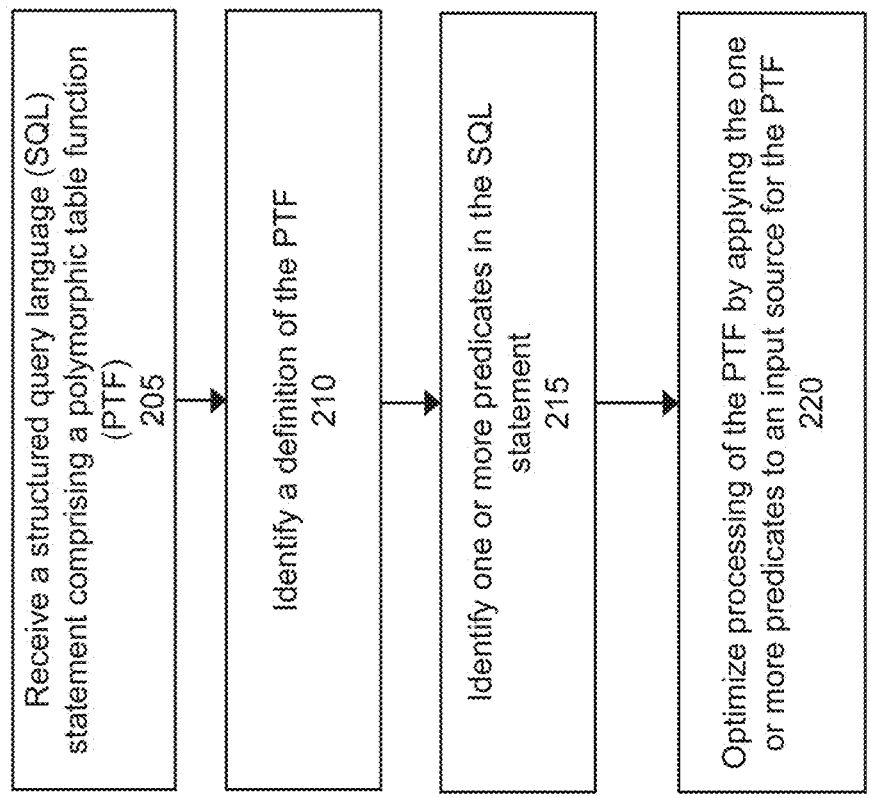
FIG. 2 shows a high-level flowchart of an approach to implement some embodiments of the disclosure.

FIG. 2 shows a high-level flowchart of an approach to implement some embodiments of the invention. At 205, a structured query language (SQL) statement invoking a polymorphic table function is received. In some embodiments, the SQL statement may include one or more predicates defined in at least the WHERE clause of the SQL statement. Additionally, some or all of the one or more predicates defined in at least the WHERE clause may be directed to the PTF such that the one or more predicates may reduce or limit the amount of data retrieved from one or more tables within the database.

At 210, a definition of the PTF is identified. A definition of the PTF may include a function that describes the general structure of the PTF and a function that fetches row(s) of data from a PTF input data source so that PTF may process its functional logic(s) via, in some embodiments, the function that fetches the rows. The function that describes the general structure of the PTF (e.g., a DESCRIBE ( )) may describe an input table/structure of the PTF, one or more arguments pertaining to the input table/structure, one or more columns corresponding to the input table/structure, an output table/structure, and one or more new columns generated by the PTF. The function that fetches the rows at runtime (e.g., a FETCH_ROWS ( )) may include programming logic to compute/calculate the results of the PTF corresponding to the rows fetched.

At 215, one or more predicates in the SQL statement are identified. As discussed above, predicates are generally directed towards data that correspond to the SQL statement. However, since the SQL statement invokes a PTF, one or more predicates may be directed to the processing of the PTF and/or to the processing of the SQL statement itself, depending on what predicates are being used and in some cases, which type of PTF is being invoked.

At 220, applying the one or more predicates from the SQL statement to an input source for the PTF may optimize processing of the PTF. The one or more predicates from the SQL statement may be transferred to affect the amount of data processed or returned from the database for the PTF because of the cross optimization that may be achieved when the SQL statement invoking the PTF is compiled as a single cursor which allows predicates from the outer SELECT statement of the SQL statement to affect the underlying input table/structure of the inner PTF.

Since views, in some embodiments, may be generated to process the SQL statement invoking the PTF, if one or more predicates defined in the SQL statement are qualified to be used in the processing of the PTF (discussed below), the one or more predicates may be applied to the first view (e.g., PTF view_1 180 from FIG. 1). The first view may provide the input data to the PTF as the PTF processes its functional logic. Therefore, if predicates are qualified to be passed to the PTF (e.g., via the first view) from the SQL statement, significant cost savings may be achieved at the first view because the input data retrieved from the database may be reduced based at least in part on the one or more predicates applied to this first view. This way, the amount of data held in memory for this first view to process the PTF functional logic may be greatly reduced over conventional approaches.

Figure 3:
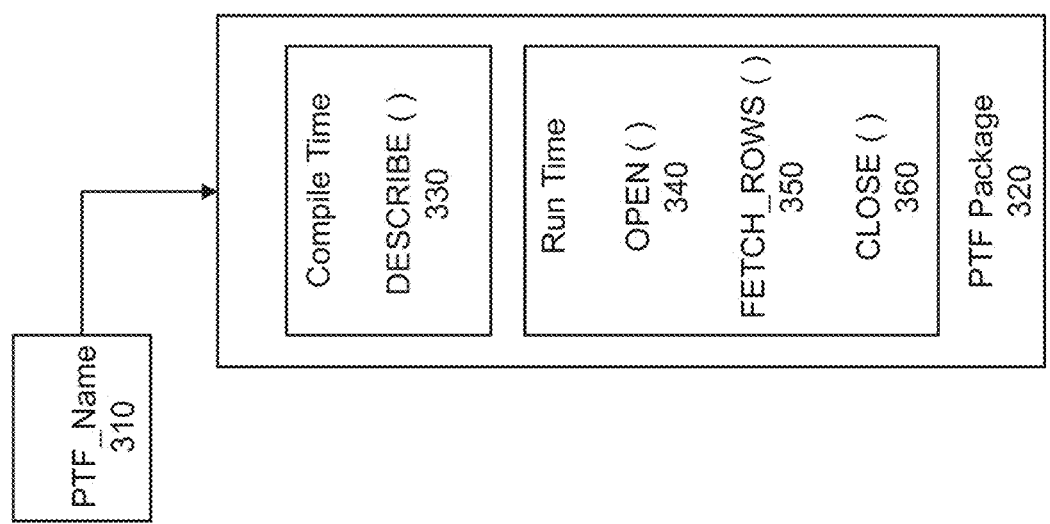
FIG. 3 illustrates an example of an approach for defining a polymorphic table function according to some embodiments of the disclosure.

FIG. 3 illustrates an example of an approach for defining a polymorphic table function according to some embodiments of the disclosure. A PTF provides an efficient and scalable mechanism to extend the analytical capabilities of the RDBMS. A client may invoke these functions without knowing the details of the implementation of the PTF, and the PTF does not need to know about the details or how the function is being executed (e.g. in serial or parallel) by the RDBMS, and whether the input rows to the PTF were partitioned and/or ordered.

Figure 10:
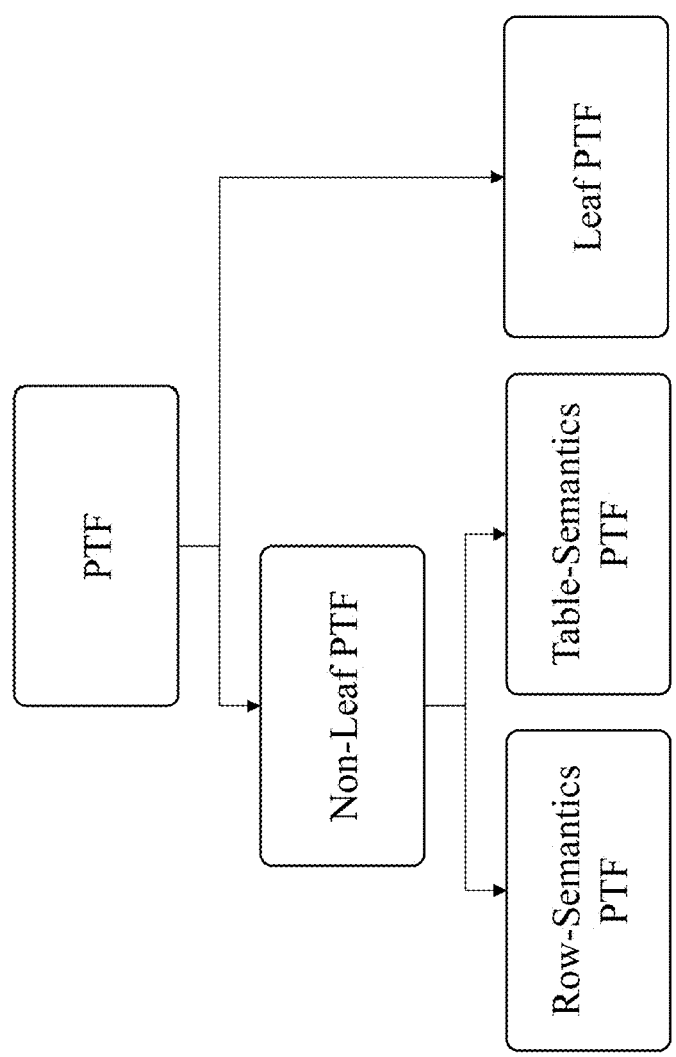
FIG. 10 is a table associated with an embodiment of the present disclosure.

The PTFs come in two major types, Non-Leaf and Leaf, depending on whether they take a table structure as an argument or not, respectively. The Non-Leaf PTFs are further categorized as Row-Semantics or Table-Semantics depending on whether each of the result rows they produce depends on a single row (e.g. row-semantics) or a set of rows (e.g., table-semantics). See FIG. 10.

The input table/structure to a Table-Semantics PTF can optionally be partitioned into sub-tables, and the input table/structure or partitions can also be ordered. This ordering and partitioning of the input data source may be specified in the SQL statement as table arguments when invoking the PTF (e.g., select * from PTF(input table order by X partition by Y, cols (Z)) where Y>30). Parallel processing of table-semantic PTFs may be performed on the partitioned sub-tables because each worker thread must have access to an entire partitioned sub-table in order to process in parallel.

This is important because since table-semantic PTFs may rely on a set of rows fetched, parallel processing should be limited to each worker thread processing its own partition of data. However, parallel processing of row-semantic PTFs may be performed on any sets of rows because for row-semantic PTFs, each row of input data contains all of the necessary information that a PTF needs to compute/calculate its result corresponding to that row. Whereas, in order to compute the results correspond to an input row, table-semantic PTFs may require data from one or more rows or may require knowledge of the history or state of the rows in order for the table-semantic PTF to compute/calculate its result corresponding to the input row.

Referring back to FIG. 3, a PTF_Name 310 may be created using a data dictionary library (DDL) function which includes naming the PTF, specifying the type of the PTF function (Leaf, Row Semantics, or Table Semantics), indicating a PTF implementation package 320, specifying a return type of the PTF as TABLE, and for non-leaf PTFs, specifying exactly one formal argument of type TABLE. Similar to other TFs, a PTF may have any number of non-TABLE arguments.

A PTF implementation package 320 may be created before (or at the same time) as the creation of PTF_Name 310. The following is an example of creating a Row-Semantics PTF called NOOP1. This PTF will simply return the input rows as the output rows without any modification or filtering:

create function NOOP(t table) return table pipelined row polymorphic using NOOP_P;

The above DDL may verify that the specified implementation package (NOOP_P) exists. Like existing TFs, a PTF can be both overloaded and have defaulted arguments. But unlike regular PLSQL functions, a PTF_Name 320 may never have any implementation since the PTF implementation is encapsulated in an associated implementation package 320.

PTF Implementation Package 320 includes a DESCRIBE function 330, an OPEN function 340, a FETCH_ROWS function 350, and a CLOSE function 360. The DESCRIBE function 330 is a function that describes the structures of the input and output of the PTF as well as required arguments for the input structure, columns that include data required for computation by the PTF, and new columns generated by the PTF for generating the output structure. The DESCRIBE function 330 is referenced during a SQL compile time of the PTF function. In other words, when a SQL statement invoking a PTF is compiled, the DESCRIBE function is inspected by the RDBMS to determine at least the structures of the input and output of the PTF. The details of the DESCRIBE function 330 will be disclosed below.

The OPEN 340, FETCH_ROWS 350 and CLOSE 360 functions are referenced during runtime by the RDBMS to help the RDBMS determine how data/rows are to be fetched to process the PTF functional logic. The OPEN function 340 and CLOSE function 360 may be executed along with the FETCH_ROWS function 350 during query execution of the PTF, although the OPEN and CLOSE functions are optional, based at least in part on the type of PTF that is being executed. This is because the OPEN 340 and CLOSE 360 functions aid the FETCH_ROWS function 350 and the RDBMS with state management during query execution of the PTF.

For example, a row-semantic PTF may typically use just the FETCH_ROWS function 350 because for row-semantic PTFs, each row of input data contains all of the necessary information that the row-semantic PTF needs to compute/calculate its functional logic. However, a table-semantic PTF may require state to be managed while the PTF retrieves a first set of rows, processes the first set of rows and retrieves a second set of rows. During the handoff of the sets of rows between the RDBMS and the table-semantic PTF, there may be state management related activities that must be passed from the RDBMS to the PTF and likewise when the PTF is done with a particular set of rows, it must send a particular state back to the RDBMS since a table-semantic PTF relies on one or more rows of data to compute its functional logic. The OPEN 340 and CLOSE 360 functions help the PTF and the RDBMS manage the states of the data the flows between.

The FETCH_ROWS function 350 may include instructions for fetching one or more rows from an input table/structure managed by the RDBMS (e.g., view_1 180 from FIG. 1), processing the data from the fetched rows to perform calculations/processing of the PTF, and sending the results of the calculations/processing of the PTF (e.g., new column values) to the RDBMS. As discussed above, the FETCH_ROWS function 350 is referenced at runtime to manage the data processing and transfers between the PTF and the RDBMS. It is to be noted that the computing/calculation portion of the PTF may be included in the FETCH_ROWS function.

Figure 4:
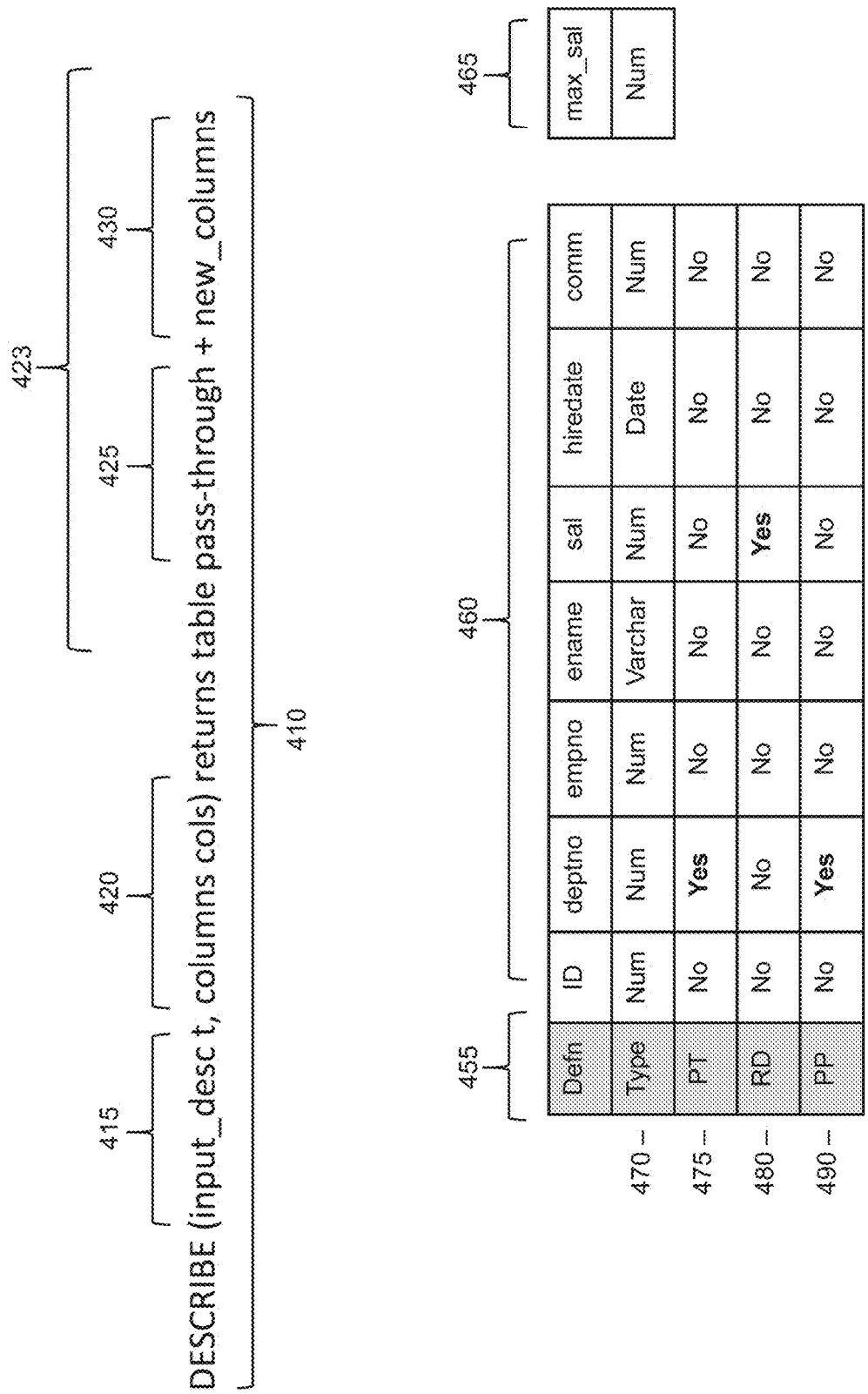
FIG. 4 illustrates an example of a function that describes a polymorphic table function according to some embodiments of the disclosure.

FIG. 4 illustrates an example of a function that describes a polymorphic table function according to some embodiments of the disclosure. As discussed above, the DESCRIBE function 410 is generated during PTF creation by a PTF author. DESCRIBE function 410 is an example of a DESCRIBE function 330 within the implementation package 320 of FIG. 3, according to some embodiments. The DESCRIBE function 410 may be received by the RDBMS to determine the structure of the input source of the PTF (e.g., the "row shape") and/or the type of output structure produced by the PTF. The DESCRIBE function 410 is invoked during SQL statement compilation when the SQL statement invokes a PTF. The SQL compiler may locate the implementation package corresponding to the PTF and inspect the DESCRIBE function 410 inside the implementation package. The argument values from the SQL statement that invoked the PTF are passed into the DESCRIBE function 410. Like any PLSQL function, the DESCRIBE function 410 may be overloaded and may also have default values for its various arguments.

The arguments of the PTF and the DESCRIBE function 410 should match. The DESCRIBE function 410 may also indicate which columns are to be kept by the RDBMS and passed unchanged to the PTF as output (these columns are the Pass-Through columns and will be discussed in more detail below). Additionally, any input columns that the PTF plans to use for its computation (called the Read columns will also discussed below) are indicated in the DESCRIBE function 410. The DESCRIBE function 410 may return one or more new columns that the PTF will create (or null if no new columns are being produced).

The DESCRIBE function 410 may include an input descriptor 415 and one or more columns 420 as input arguments. In some embodiments, the input descriptor 415 may be only a single input descriptor 415. Additionally, DESCRIBE function 410 may also include an output structure 423. The output structure 423 may include one or more pass-through columns 425, and one or more new_columns 430. One of ordinary skill in the art may appreciate that these arguments of the DESCRIBE function are simply examples of what may be contained within the DESCRIBE function. Some embodiments may include all of the arguments, while some embodiments may include a subset of the arguments, depending on the desired result when defining the PTF.

The input descriptor 415 is a descriptor of an input structure that will be received once the PTF is invoked by a SQL statement. The input descriptor 415 defines an input structure that will contain the input data for the PTF. Since this is a polymorphic function, polymorphic in a sense that neither the input structure nor the output structure may be known at the time of PTF creation, it is necessary for the PTF to be able to define and create an input structure once an input structure argument is passed in to the PTF during invocation of the PTF.

The columns 420 is an input argument that indicates which columns from the input structure 415 the PTF plans to use for its computation (called the Read columns will also discussed below). The columns 420 argument may only be used when specifying arguments to a PTF function invocation in a from-clause of the SQL statement. The columns 420 may be received in two formats: (a) A list of columns names, (b) A list of column names with associated types.

Output structure definition 423 may be a combination of the possible columns that may be combined to form the output data structure that is returned by the PTF. Output structure definition 423 may include pass-through columns 425 and new columns 430.

Pass-through columns 425 are columns that are to be kept by the RDBMS and passed unchanged to the PTF as output. The pass-through columns 425 are an optimization feature of the present disclosure that helps to reduce the amount of data that is passed between the RDBMS and the PTF during execution of the PTF. If a column is marked as a pass-through column, the RDBMS will not send data from that column (e.g., of PTF view_1 180 from FIG. 1) to the PTF for processing since the data for that column will not be changed by the PTF and since the data for that column will not be needed by the PTF for processing. Therefore, there is no need for the RDBMS to send the data from the pass-through columns to the PTF. Instead, the RDBMS will hold the data from the pass-through columns until the PTF has completed its processing, at which time, the RDBMS will put together data from the pass-through columns plus data from one or more new columns generated by the PTF so the second view, representing the outer SELECT statement may further filter the output data structure based on the one or more predicates from the outer SELECT statement referring to one or more new columns generated by the PTF.

New_columns 430 are new columns that are generated by the functional logic/computation logic of the PTF identified with the function that fetches rows for the PTF (e.g., FETCH_ROWS 350 from FIG. 3). New_columns 430 are identified in the Describe function 410 of the PTF. A new column defined by a PTF may be computed based on a one to one match to an input column from the input table. In such an example, a columns 420 input argument may generate a new_column 430 to contain the result of the computation. One of ordinary skill in the art may appreciate that if a one to one match of an input column from the input table to a new column output is defined for a particular PTF, and a SQL statement received includes, for example, two columns 420, then the PTF would generate two new_columns 430 in the output structure.

In other embodiments, some PTFs may not generate or create new column values, and thus, new_columns 430 may not be defined in the Describe function 410 of the PTF. However, in other embodiments, a new_column 430 may be computed based on, for example, two columns from an input table. For example, the PTF may be an addition function of two columns of the input table to generate a sum of the two columns in a new column. In such an embodiment, the DESCRIBE 410 may require two columns 420 as input and the resulting new_column 430 output would be the sum of the two columns identified when the PTF is invoked. One of ordinary skill in the art may appreciate that if a one to one PTF is defined and a SQL statement received includes, for example, two columns, then the PTF would generate two new_columns 430 in the output structure. As discussed above, new_columns 430 is optional. Some embodiments may include a PTF that does not return any new columns, in which case, the output structure definition 423 may not include new_columns 430.

In some embodiments, some SQL statements may not select all of the new columns that are generated by the PTF . . . new_columns 430 may contain more new columns that may be generated by the PTF. However, the SQL statement that invoked the PTF may only select, for example, one new column when the PTF may generate more new columns than just one new column. One significant advantage of not having the PTF process as a separate SQL cursor is that the PTF, during execution, is able to determine which new columns that the PTF is producing are not needed by the SQL statement (e.g., any new columns that the PTF may produce that were not selected by the SQL statement) may be skipped. This may be significant because certain computations to generate new columns may require significant processing. However, if it can be determined that some of the new columns are not needed by the SQL statement that invoked the PTF, the PTF can save much processing costs by skipping the unselected new columns altogether (e.g., projection pruning).

C-store 435 is an immutable state management key-value pair that is generated by a DESCRIBE function 410 that may be needed subsequently during execution by an OPEN, FETCH_ROWS, and CLOSE procedures. The most common use of compilation state is to keep track of the columns to be read and the new columns that are to be produced. This mechanism allows the PTF to store compilation state similar to how various internal components of an execution plan store their respective state (e.g., an x-store). C-store 435 is optional to PTFs. Some embodiments may not include a C-store 435, but when an embodiment does include a c-store 435, the c-store 435 may also be directly included in the output data structure 440 or indirectly influence one or more new columns included in the output data structure 440 (not shown in FIG. 4). Similar to a c-store 435 providing state management via a key-value pair generated by a DESCRIBE function 410, in some embodiments, an x-store state management key-value pair may be defined within the OPEN, FETCH_ROWS, and CLOSE procedures to allow the run time environment the ability to manage different states corresponding to the run time execution of the PTF. For example, after an OPEN function call is made there may be one or more FETCH_ROWS calls made to the RDBMS to retrieve and process data for the PTF before a CLOSE function is called. If there is a need to manage a state of one or more values during the run time execution of the PTF, wherein the state may be an aggregate value of data from preceding rows that may need to be kept to be used for additional rows to be fetched, one or more x-store key-value pair may be used to store the aggregated value between FETCH_ROWS calls. Unlike the c-store 435 which is an immutable key-value pair, the x-store key-value pairs are mutable within the session to allow the run time execution to store and update their respective states. Furthermore, the system guarantees that the x-store value(s) maintained within a run time execution of the PTF is used only by that particular instantiated execution of the PTF. This is important when there may be parallel processing of multiple instantiation of the PTF to ensure that each instantiated process handling the PTF has visibility and management of its own x-store key-value pair(s).

Table 460 is an exemplary input table descriptor of an Emp table included in a Run_Max table-semantic PTF invocation (not shown in FIG. 4). The Run_Max table-semantic PTF takes an input table/structure and returns a new column that indicates the maximum value of a column for a particular row that is specified in the columns 420 argument that is relative to other preceding rows that have been processed. In other words, the results produced by the Run_Max table-semantic PTF relies on knowledge of a running Max value column from prior rows processed. For example, for a particular partition of data for a deptno, ordered by hiredate, each employee's salary is compared with the max salary of employees hired before (e.g., because the data is ordered by hiredate) within the deptno (e.g., because the data is partitioned by deptno). This max salary value must be maintained between the PTF and the RDBMS as the PTF processes the next fetched row within a particular partition.

Definition column 455 is illustrated to help clarify the definitions of each the row of table 460. Definition column 455 is not intended to be included in the structure of table 460 and definition column 455 is merely being illustrated to clarify the rows of table 460.

In this example, table 460 depicts the input table of Emp (e.g., Employee) passed in by a SQL statement invoking the PTF. The table 460 comprises one or more columns. New column 465 may be named max_sal because of a default naming rule defined by the DESCRIBE function 410 such as new_col_name="max_"+column name from column 420 (not shown in FIG. 4).

Row 470 indicates the data type of the particular column. During SQL compilation, it is important to fully understand the structure of the input and output of the PTF function. Here, row 470 indicates the scalar values of each of the columns from the input table Emp. Additionally new column 465 shows a type of Num. This column type of Num may have been copied from the column type of sal from which this max_sal column is correlated to as a default. In other embodiments, new column 465 max_sal may not have the same scalar value as its source column(s), for example, new column 465 may be the result of a concatenation of two column values having a Num and Varchar data type, in which case, the new column may be Varchar as opposed to Num. In this example, the DESCRIBE function 410 may set the new column type to Varchar to override the default copying of a scalar value type from its source column from the input structure.

Row 475 indicates whether or not the respective column(s) are pass-through columns or not. For Row Semantics PTF, by default, all columns are marked as pass-through (e.g., the DESCRIBE function only needs to clear the flags if some columns are not to be marked as pass through), whereas for Table Semantics PTF the default pass-through value for all the input columns is false (e.g., No). For the Table Semantics PTF, the partitioning columns are always pass-through and this cannot be changed by the DESCRIBE function. Note, the notions of pass-through and Read columns are orthogonal, and indicating a column as one has no implication for the other (e.g., as depicted in FIG. 4).

Row 480 indicates whether or not the respective column(s) are Read columns. The read columns are input columns that the PTF wants to process when FETCH_ROWS are called. The PTF indicates the read columns inside a DESCRIBE function 410 by annotating the read columns in the input table descriptor table 460. Only the indicated read columns will be fetched and thus available for processing during FETCH_ROWS. Typically, the PTF invocation inside the SQL statement will use the COLUMNS 420 argument to indicate which columns the SQL statement wants the PTF to read, and this information is passed to the DESCRIBE which then in turn sets the Read indicator Boolean flag on row 480. One of ordinary skill in the art appreciates the indicators shown as Yes and No in rows 475 and 480 may be stored as Boolean flags having "0" and "1".

One of the benefits of providing a read column is to further indicate which columns from the input table the PTF needs to be passed to the PTF from the RDBMS so the PTF may perform its computation. This furthers improve the efficiencies of the processing of PTFs because this reduces the amount of data that is actually passed between the RDBMS and the PTF during execution of the PTF.

Row 490 indicates whether or not the respective column(s) may be a predicate pushdown column. A predicate pushdown column is a column that corresponds to a predicate identified in the WHERE clause of a SQL statement may be transferred to a query process that retrieves data as input data for the PTF. As discussed above, the predicate may filter/reduce the number of rows returned from the database for the input table/structure for the PTF. Since Run_Max is a table-semantic PTF, the only columns that may qualify as a predicate pushdown column for the PTF are columns that are used in a partition by table argument when invoking the PTF. Here, the invocation of Run_Max may have included a partition by deptno column because the deptno indicator on row 490 shows that deptno may be a predicate pushdown column to the input table/structure for Run_Max. However, for row-semantic PTF, all input columns may qualify as predicate pushdown columns.

Figure 5A:
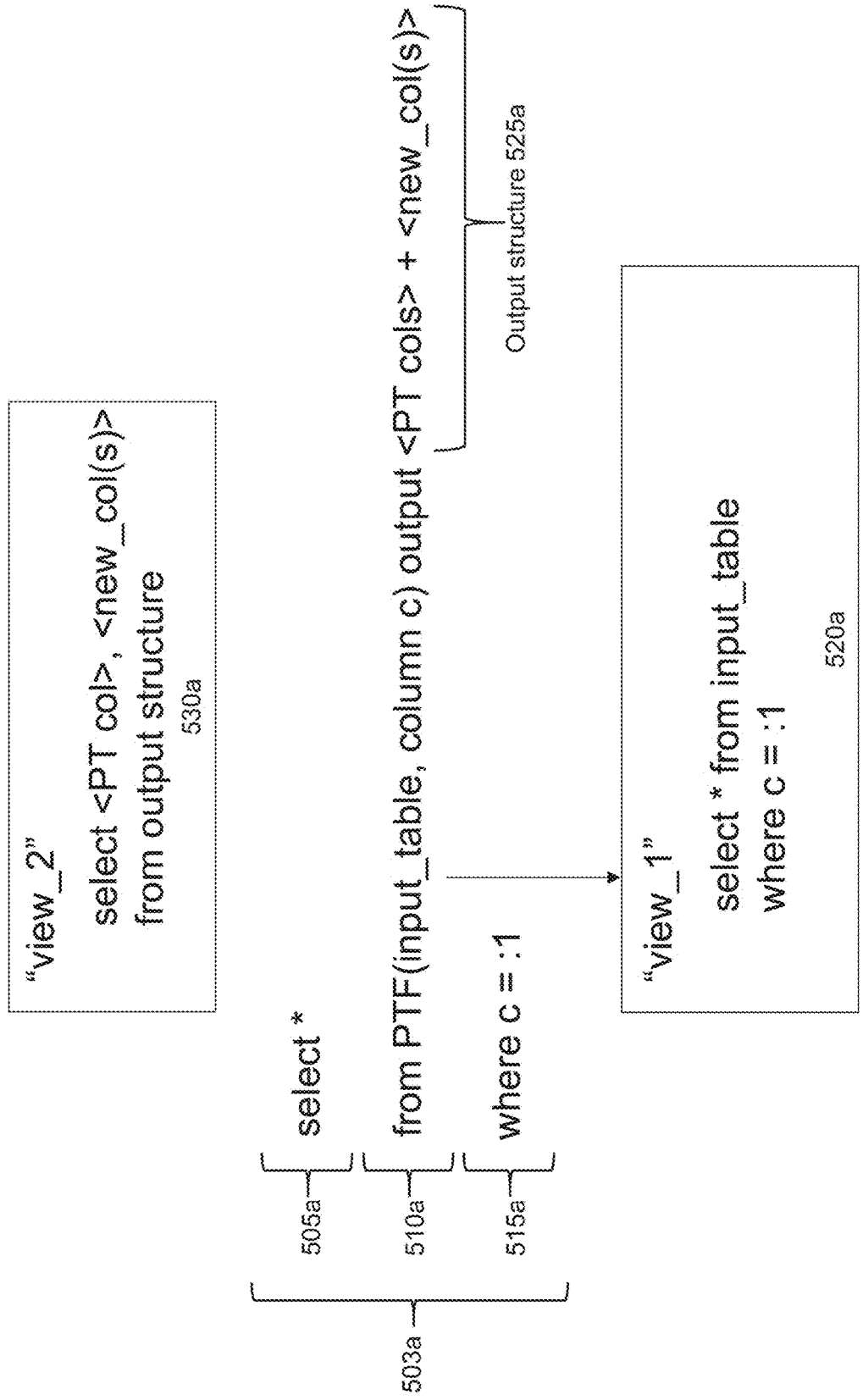

FIGS. 5A-5C illustrate an example of views generated from a SQL statement invoking a polymorphic table function according to some embodiments of the present disclosure. FIG. 5A illustrates a functional prototype of a SQL statement invoking a polymorphic table and a couple of functional prototype of views generated as a result. FIGS. 5B-5C illustrate different embodiments of SQL statements invoking a polymorphic table and different embodiments of views generated as a result, according to some embodiments of the present disclosure.

FIG. 5A illustrates a functional prototype of a SQL statement 503a comprising a SELECT statement 505a, a FROM clause 510a and a WHERE clause 515a. The FROM clause 510a invokes a PTF function having input_table as an input table argument and column c as an input column argument. Additionally, the WHERE clause 515a indicates a predicate of column c is provided in the SQL statement 503a.

During PTF query processing, particularly during the compiling phase, an execution plan for the SQL statement cursor may have view_1 520a and view_2 530a generated based on the information obtained from inspecting a definition of the PTF, particularly in the DESCRIBE function, along with the arguments from the invocation of the PTF function Because, in some embodiments, the PTF query processing generates views as opposed to additional SQL cursors for the PTF, the present disclosure may take advantage of existing optimizations available to view processing such predicate pushdown of predicate c from the WHERE clause 515a into the view_1 520a to reduce/limit the number of rows returned from the database for view_1 520a. The ability to pass predicate c from SQL statement 503a into the PTF view_1 520a is possible because of the transformation of the PTF into views as opposed to creating additional SQL cursors for processing the PTFs. View_2 530a takes as input, the completed output structure 525a generated by the RDBMS which comprises one or more pass-through columns and one or more new columns generated by the PTF (if any). From this output structure 525a, view_2 530a may generate its results where the select statement in view_2 comprises the pass-through columns of input_table, as shown in view_1 520a, and any new col(s) that may be produced from the PTF that is of interest to the SELECT statement 505a of the SQL statement 503a. Additionally, as discussed above, view_1 520a and view_2 530a may be designated as non-mergeable views because these views are generated for the specific purpose of processing the SQL statement 503a that invokes a PTF in a single cursor. Therefore, these views, unlike most views, cannot have their data from one view be merged or collapsed with data from any other view.

FIG. 5B illustrates a SQL statement 503b comprising a SELECT statement 505b, a FROM clause 510b and a WHERE clause 515b. The FROM clause 510b invokes a PTF function Run_Max having "Emp order by hiredate partition by deptno" as input table arguments and column (sal) as an input column argument. Additionally, the WHERE clause 515b indicates predicates deptno=30 and max_sal>10 are provided in the SQL statement 503b.

An execution plan for the SQL statement cursor may have view_1 520b and view_2 530b generated based on the information obtained from inspecting a definition of the Run_Max PTF, particularly in the DESCRIBE function, along with the arguments from the invocation of the Run_Max PTF.

Because, in some embodiments, the PTF query processing generates views as opposed to SQL cursors for processing the PTF, the present disclosure may take advantage of existing optimizations available to view processing such as pushing the predicate deptno=30 from WHERE clause 515b into view_1 520b to reduce/limit the number of rows returned from the database for view_1 520b. The ability to pass predicate deptno from SQL statement 503b into the PTF view_1 520b is possible because of the implementation of views as opposed to generating additional SQL cursors for processing the PTFs.

It should be noted that in this embodiment, Run_Max is a table-semantic PTF because as discussed above, Run_Max requires looking at multiple rows in order to calculate the maximum value of a particular column. Because Run_Max is a table-semantic, the only way to push predicates from the SQL statement 503b through the PTF to the underlying table is via a partition by column indicated as a table argument when invoking the Run_Max PTF. Here, the Run_Max invocation included a partition by deptno argument that sets the stage for the ability to push the predicate deptno=30 from the WHERE clause 515b into the view_1 520b. Furthermore, during SQL compilation of the SQL statement 503b, the columns which were identified as being qualified for being a predicate for view_1 520b was identified as the deptno column because deptno was the partition by table argument upon invocation of the Run_Max PTF from SQL statement 503b.

Additionally, it should be noted that the other predicate max_sal>10 was not included in view_1 520b. This is because view_1 520b does not have a max_sal column. View_1 520b is an input structure to the PTF to generate the max_sal column which is depicted in the select statement on view_2 530b. Therefore, in this embodiment, predicate max_sal>10 from the WHERE clause 515b is mapped to view_2 530b instead of view_1 520b. Furthermore, as discussed above, view_1 520 and view_2 530 may be designated as non-mergeable view. Yet even furthermore, column deptno may be marked as a column that qualifies as a predicate pushdown column since Run_Max is a table-semantic PTF and deptno is a partition by column.

Another significant advantage of the present disclosure is that in this embodiment and in other embodiments where the SELECT statement selects a subset of a total available columns of a structure (e.g., table, view, etc.), a projection pruning of the columns efficiency may be achieved. In the present embodiment, the SELECT statement 505b selects four columns from the emp table. Assuming the emp table comprises seven columns as depicted in table 460 from FIG. 4, this means three other columns (e.g., ID, ename, and comm) are not selected. Since the PTF is not processed as a separate SQL cursor, the PTF, during execution, is aware that four of the seven columns from the emp table is selected. Therefore, the input structure for the PTF (e.g., view_1) includes the four selected columns, as opposed to the seven columns. Since the input structure only contains four columns, the output structure may contain only the four columns and the new column max_sal. Thus, the projection pruning of the additional three columns in this embodiment results in additional savings of data not being stored in memory that otherwise would have been stored unnecessarily by legacy systems.

In some embodiments, when invoking a PTF from within a SQL statement, the input table/structure argument may only take one input table/structure as an argument. Although this may appear to be a limitation, a workaround may be performed by using a WITH statement.

FIG. 5C illustrates a SQL statement 503c comprising a WITH statement 505c, a SELECT statement 510c and a FROM clause 515c. The WITH statement 505c allows the joining of one or more tables together to form an input table/structure to be used as an argument for a PTF invocation. By using the WITH statement to generate an input table/structure where the input table/structure may be combined from one or more tables, many flexibilities of SQL statements are available to invoke a PTF from within a SQL statement.

FROM clause 515c invokes the PTF function Run_Max having "T . . . " as the input table argument. A compiler would translate the input argument of T to represent all columns from the emp and deptno tables. The compiler would then inspect the data dictionary of the RDBMS to ascertain the structures of tables emp and deptno. The compiler would then generate an input table descriptor having the columns of both tables in the structure. The remaining steps are relatively similar to other embodiments. One of ordinary skill in the art may appreciate the remaining processing steps of compiling the SQL statement 503c and generating view_1 520c and view_2 530c is similar to the previous embodiments in FIGS. 5A-B.

Figure 6:
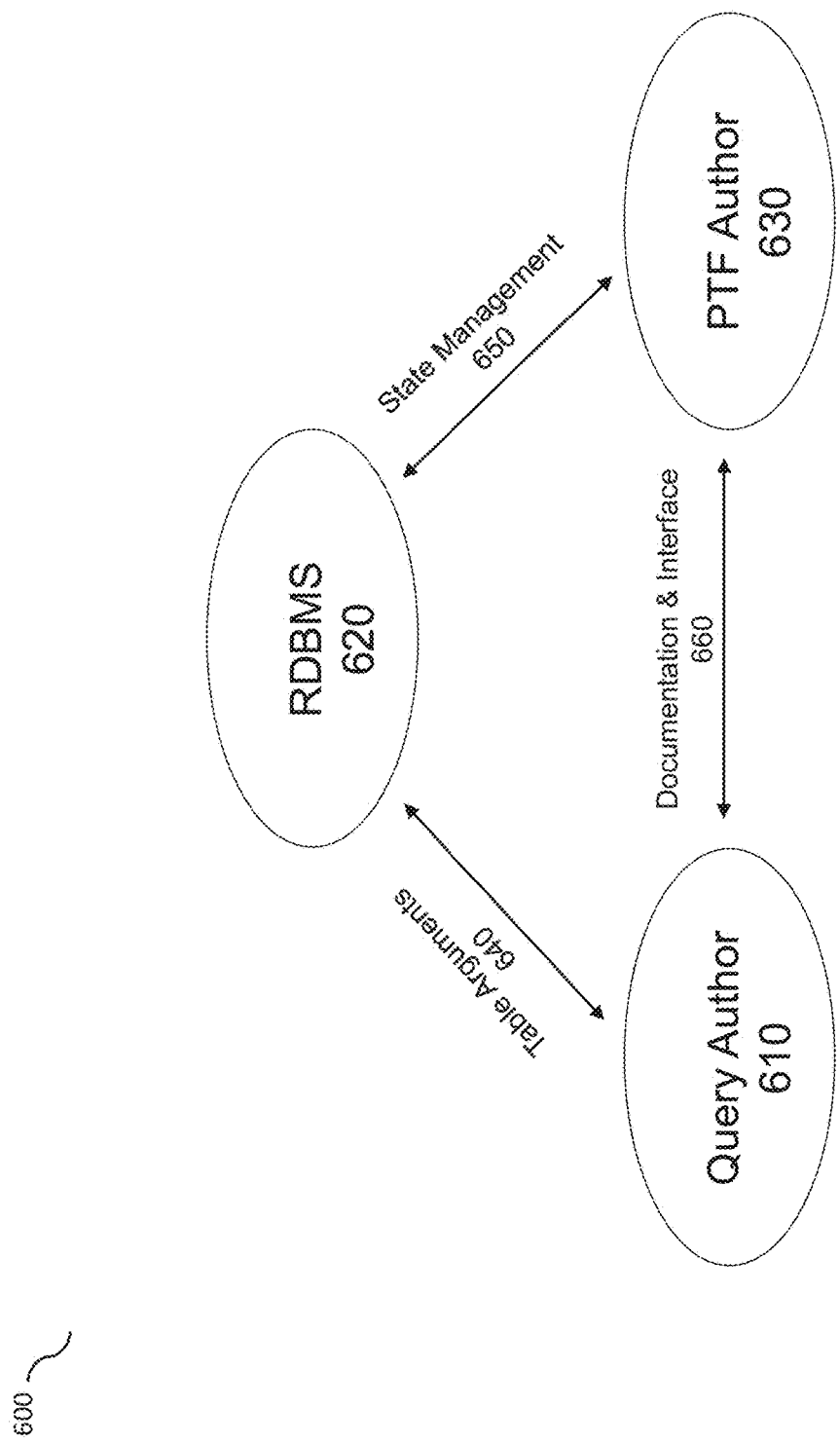
FIG. 6 illustrates relationships of three actors for implementing polymorphic table functions according to some embodiments of the disclosure.

FIG. 6 illustrates relationships of three actors for implementing polymorphic table functions according to some embodiments of the disclosure. System 600 illustrates three actors involved in the implementation of a PTF. Query author 610 may be a person, a computer program or application, etc. that generates SQL statements to be executed by a database system. A RDBMS 620 may be any relational database management system. A PTF Author may be a person, a computer program or application, etc. that generates polymorphic table functions. The implementation of PTFs is handled with a separation of concerns concept. The present disclosure organizes the functions of the three actors by separating the concern of each actor. For example, a query author 610 using a PTF should only need to read documentations 660 of a PTF generated by a PTF author 630 without worrying about how the RDBMS 620 operates. Similarly, the RDBMS 620 is not concerned about the documentation of PTF author 630 for a PTF. However, there are some information communicated between the PTF 630 and RDBMS 620 during query compilation and query execution.

When a PTF author 630 writes a PTF, the PTF author 630 assumes (1) the PTF executes serially, since the PTF Author 630 does not care about any parallel processing; and (2) the PTF executes only on one table (e.g., one input table/structure as an argument). Therefore, it is a lot less complicated for the PTF author 630 to generate the PTF when the PTF author 630 is not concerned with parallel processing or the PTF executing on more than one table. Furthermore, if query author 610 is providing table order by and/or partition by arguments/parameters 640, the RDBMS 620 may care about the order by and/or partition by arguments/parameters because it may affect how the RDBMS efficiently processes the PTF (e.g., parallel processing). However, the PTF author 630 may not care at all about the order by and/or partition by arguments because these arguments are handled by RDBMS 620 and defined by query author 610.

For example, when the query author 610 defined the order by and/or partition by arguments, the query author 610 is not instructing the RDBMS 620 how to perform the query. How to perform the query is the responsibility of the RDBMS 620. Clearly, the processing of a table-semantic PTF by the RDBMS 620 should be executed in parallel based at least in part on the partition by argument specified by the query author 610. By separating the implementation of a PTF across three separate actors, many efficiencies may be realized such as improved performance to the computer itself, for example, by allowing the RDBMS 620 to efficiently process a table-semantic PTF in a parallel fashion based at least in part on the query author 610 providing a partition by argument in the invocation of the PTF, even though the PTF author 630, when generating the PTF, does not know about or even care how the PTF will be used by a query author 610 and executed by the RDBMS 620.

Figure 7A:
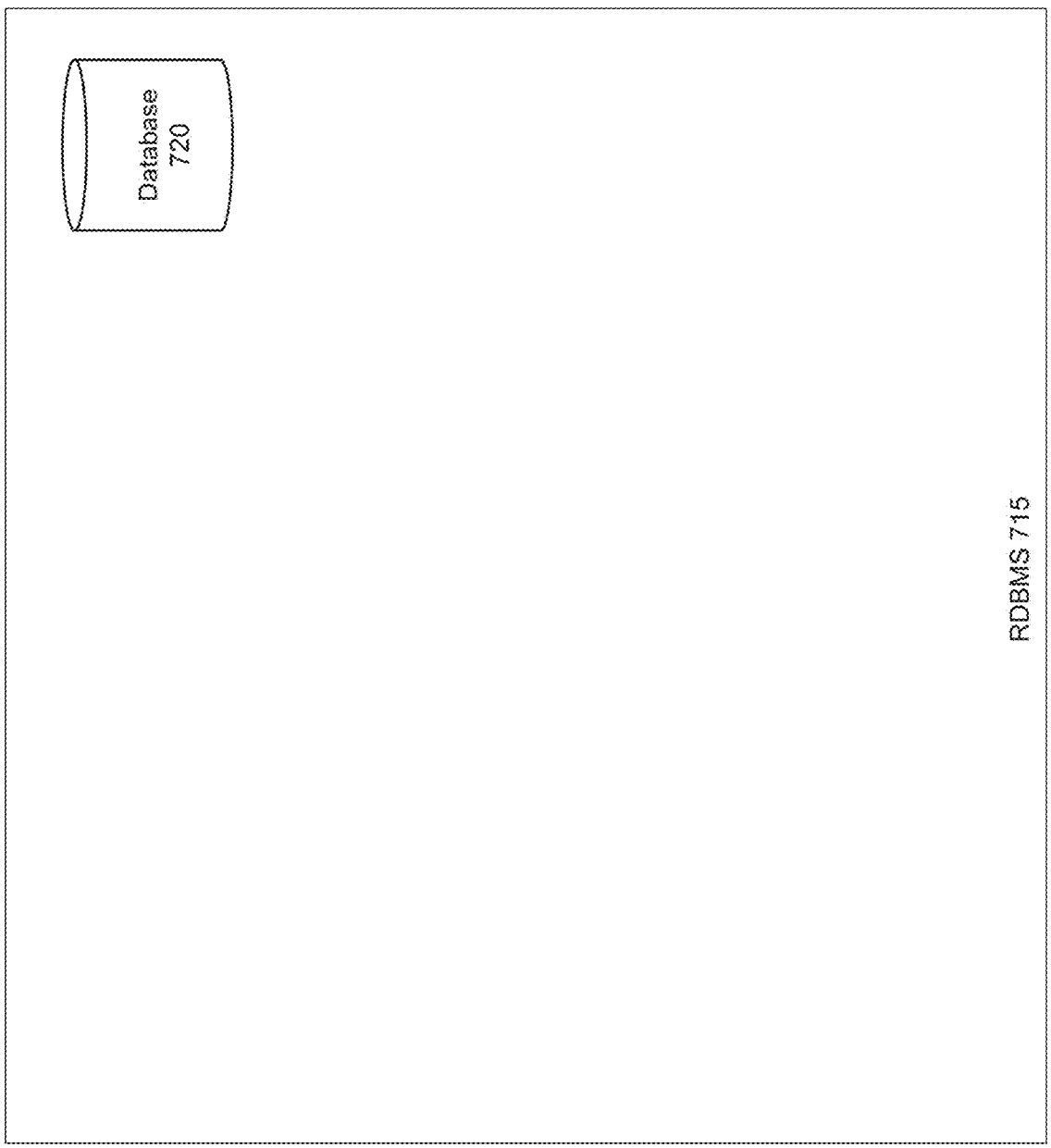
FIGS. 7A-7F provide an illustrative example of an approach to implement polymorphic table functions according to some embodiments of the disclosure.

FIGS. 7A-7F provide an illustrative example of an approach to implement polymorphic table functions according to some embodiments of the disclosure. FIG. 7A illustrates a client 705 sending a SQL statement 710 to a RDBMS 715, the SQL statement 710 invoking a PTF Run_Max function. The RDBMS 715 operatively coupled to a database 720, the database 720 comprising one or more tables. The SQL statement 710 may include "select deptno, empno, sal, hiredate, max_sal from Run_Max(emp partition by deptno order by hiredate, columns (sal)) where deptno=30 and max_val>10" (not shown in FIGS. 7A-7D).

As discussed above, Run_Max computes the running max value of a particular column of interest. Here, the column of interest is salary (e.g., sal). Since the data is ordered by hiredate and partitioned by department number (e.g., deptno), the PTF would fetch the first employee hired for a particular department and the first max salary would be the first employee hired for that department. The next hired employee's salary would be fetched and evaluated against the current state of the data (e.g., the max salary of the first employee). If the salary of the second employee is higher than the first employee, then the new column max salary for the second employee would be the salary of the second employee. However, if the salary of the first employee is higher than the salary of the second employee, then the max salary for the second employee would be the salary of the first employee.

Figure 7B:
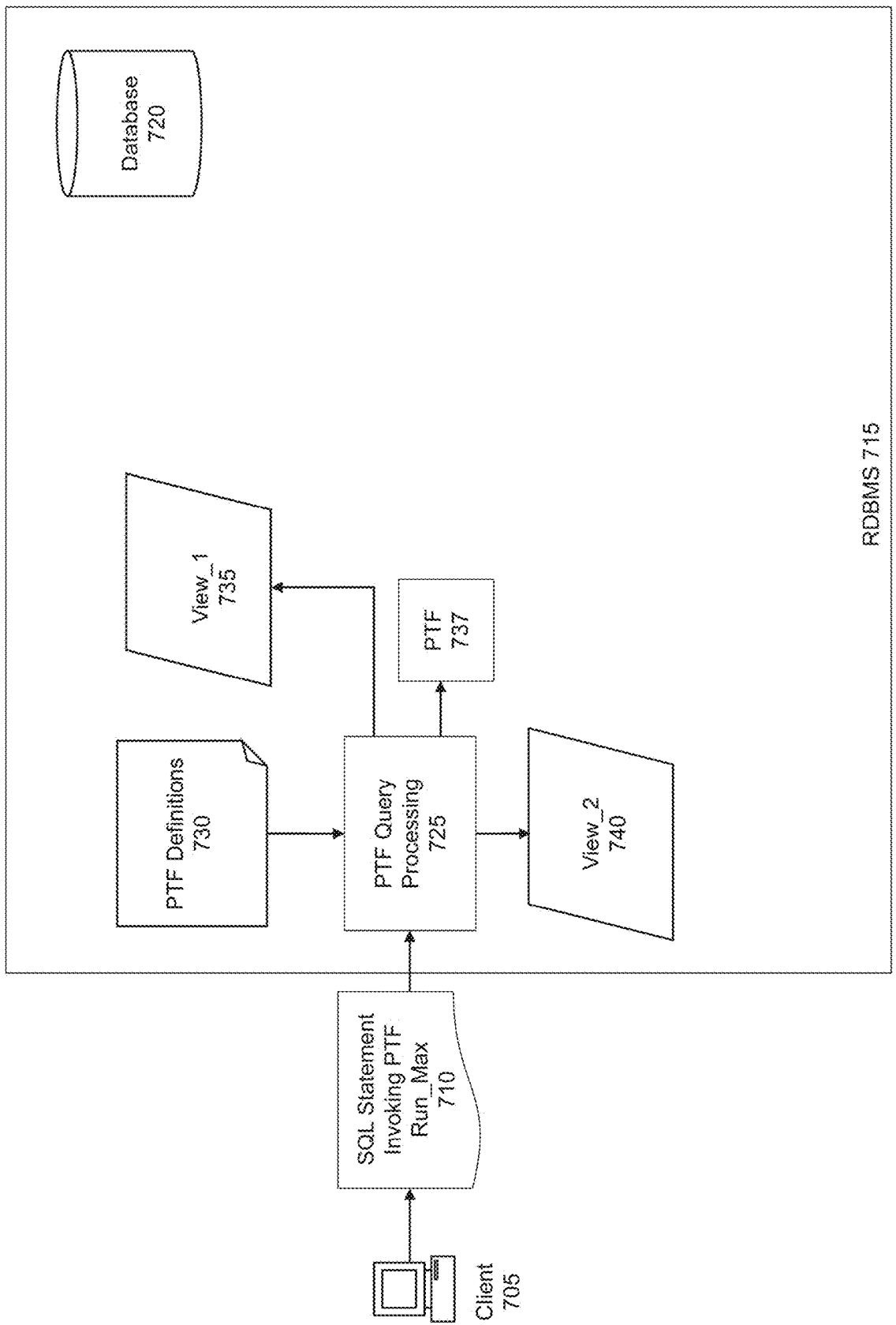

FIG. 7B shows the SQL statement 710 being received by a PTF query processing 725. The query processing 725 may parse, compile and optimize the SQL statement 710 by inspecting a PTF definitions library 730 to determine the input table/structure, output table/structure, arguments, and functioning logic of the Run_Max PTF. The query processing 725 may further generate an execution plan which includes generating view_1 735 as the input table/structure for the Run_Max PTF, PTF functioning logic 737 as the executable to perform the function logic of the PTF during runtime and a view_2 740 as an output table/structure for the SQL statement 710. In some embodiments, PTF functioning logic 737 may be included within a FETCH_ROWS function of the PTF.

Figure 7C:
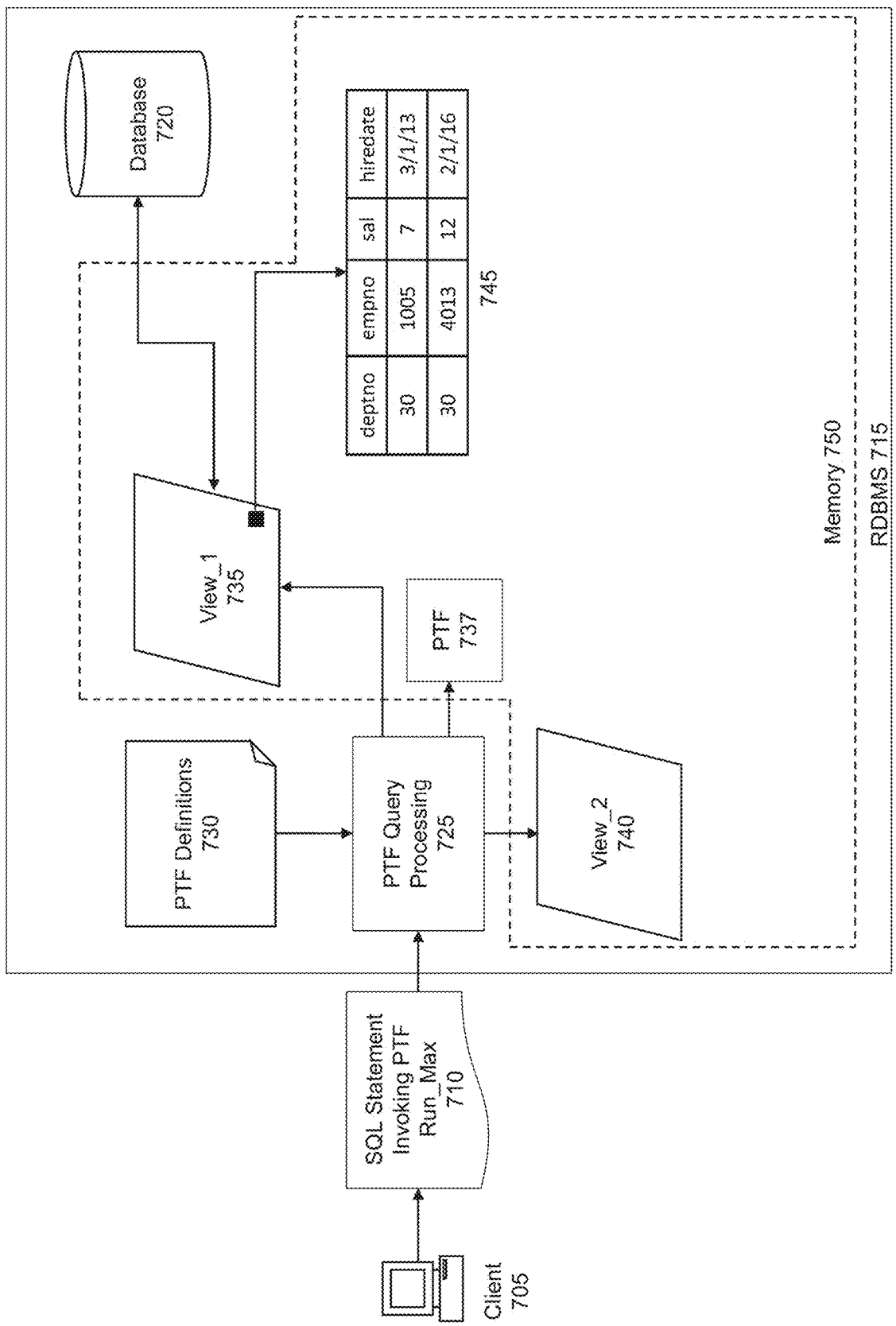

FIG. 7C shows view_1 735 executed against database 720 represented as input table/structure 745. It should be noted that the predicate of deptno=30 was applied to view_1 735 because view_1 735 only shows data records for the table emp for only deptno=30. In this embodiment, there are only two rows returned from the database as the input rows for the PTF. One of ordinary skill in the art may appreciate there may be much more data rows returned based on the various sizes of the plurality of database tables in database 720.

Memory 750 may be volatile memory or cache memory within the RDBMS 715. The execution of SQL statement 710 typically operates in memory of a RDBMS 715. Therefore, any opportunity to reduce the amount of memory required to process a function may greatly improve the functioning of the RDBMS itself because a smaller footprint of data required in memory allows the RDBMS 715 to process more efficiently by having less data required to process which my result in faster computation time of the overall results of the SQL statement, which may improve the functioning of the computer itself.

Figure 7D:
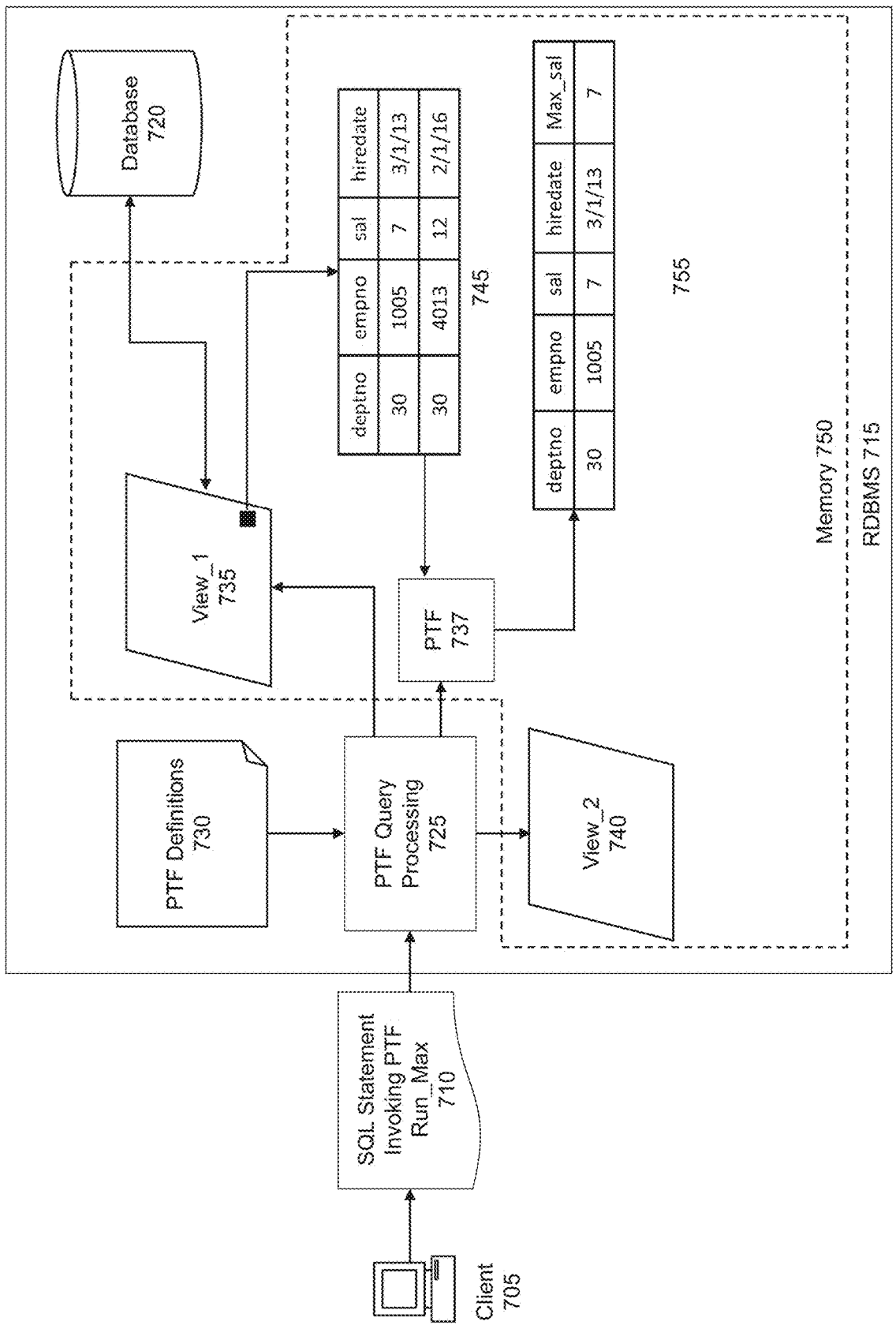
Figure 7E:
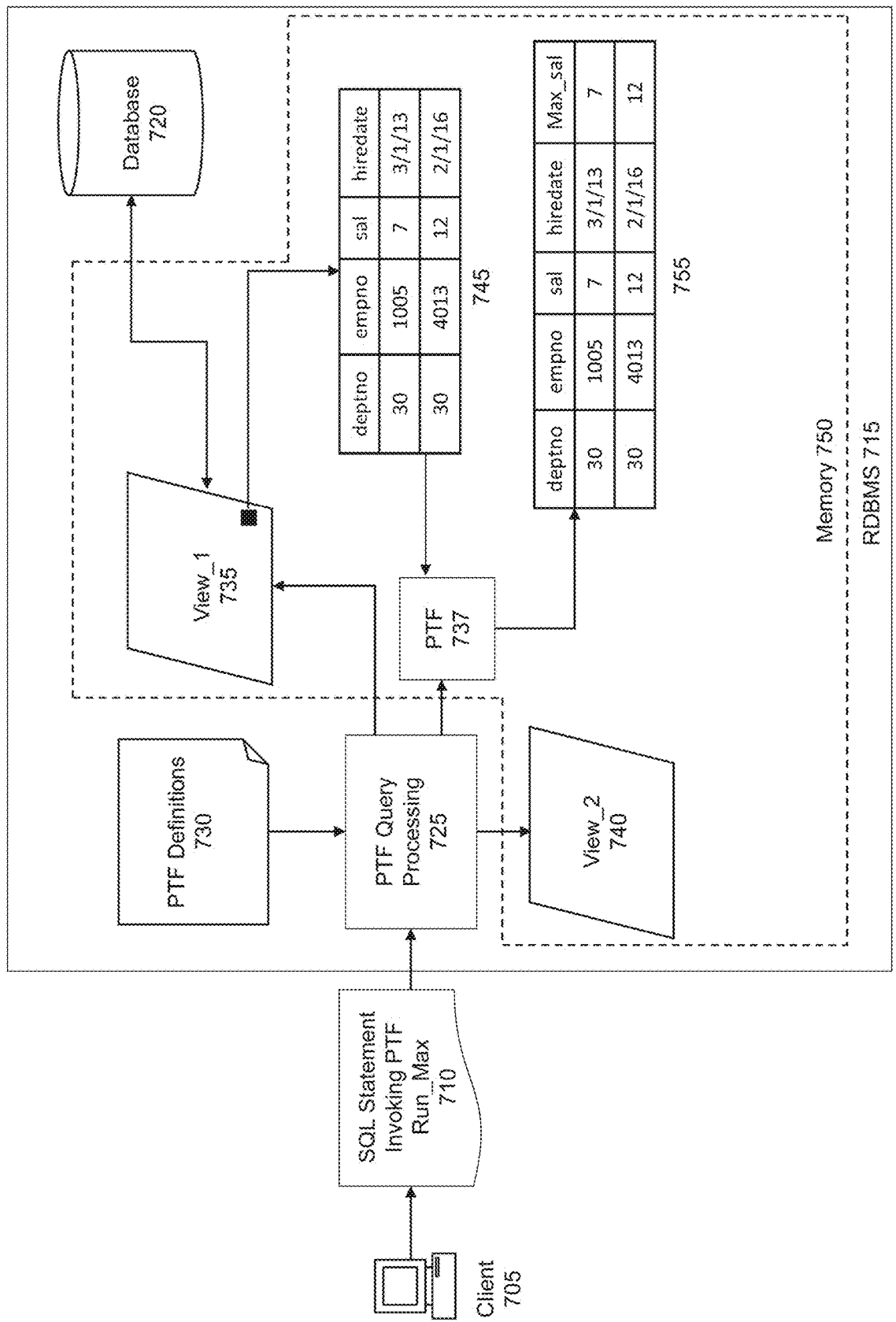

FIG. 7D shows the PTF functioning logic 737 interacting with the input table/structure 745 to generate the first max_sal value of "7" for empno 1005 as shown in output table/structure 755. FIG. 7E shows the PTF functioning logic 737 interacting with the input table/structure 745 to generate the second max_sal value of "12" for empno 4013 as shown in output table/structure 755. Output table structure 755 is in memory and managed by the RDBMS 715.

Figure 7F:
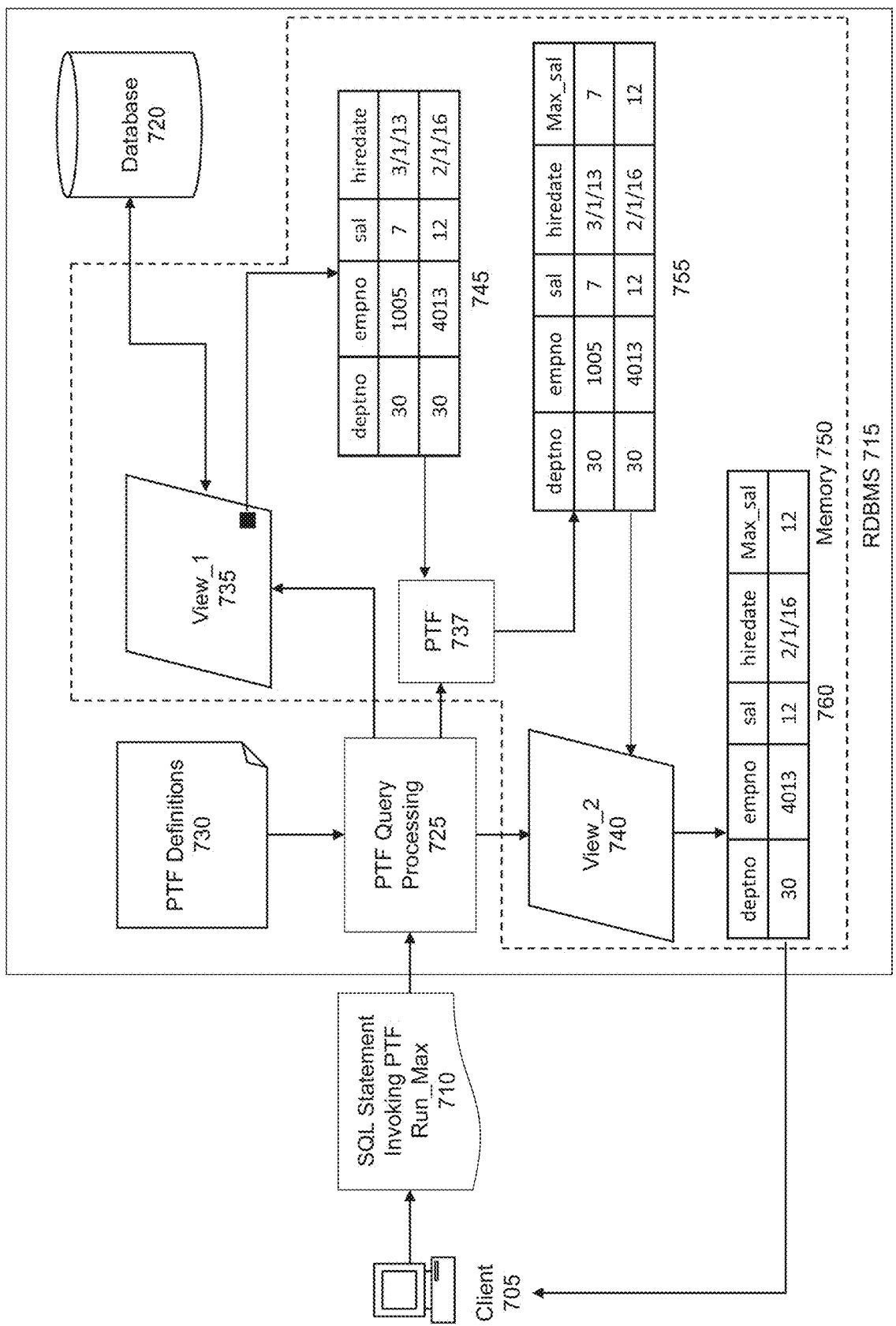

FIG. 7F shows view_2 740 executed against the output table/structure 755. In the present embodiment, only one row is returned from view_2 740 as depicted in the results 760. Because the SQL statement included a predicate of max_sal>10, view_2 returns only the single record where max_sal is >10 as depicted in the results 760.

This approach therefore enhances the efficiencies of processing polymorphic table functions and/or non-polymorphic table functions by handling the SQL statement in such a way that a single cursor is implemented to handle both the outer SELECT statement and the inner PTF. The way this is accomplished, in some embodiments, is by implementing multiple levels of view processing to process the outer SELECT statement and the inner PTF. Leveraging view processing not only allows the PTF to be processed without creating a separate SQL cursor for the PTF, but also the bulk of the query processor may process the PTF with minimal PTF specific changes to the RDBMS.

The present disclosure allows the system to push predicates identified within the SQL statement through the PTF and into the input table/structure of the polymorphic table function to reduce the number of rows returned from the database to the PTF (in memory) for processing of the PTF functional logic (e.g., partition pruning). Additionally, static and dynamic projection pruning of columns may further improve the efficiencies of processing the PTF because the PTF knows which columns are selected from the SQL statement and which new columns are requested from the PTF so certain columns may be eliminated as input data and certain new columns not selected by the SQL statement but may be created by the PTF may be skipped. Furthermore, identifying pass-through columns and read columns help to minimize the amount of data that is passed between the RDBMS and the PTF. And yet furthermore, the ability to parallelize a table-semantic PTF (e.g., by the partition by column) and a row-semantic PTF (e.g., by any input columns) because the PTF is processed within the SQL statement as a single cursor as opposed to operating in separate cursors may also greatly improve the performance of processing SQL statements that invoke PTFs.

System Architecture Overview

Figure 8:
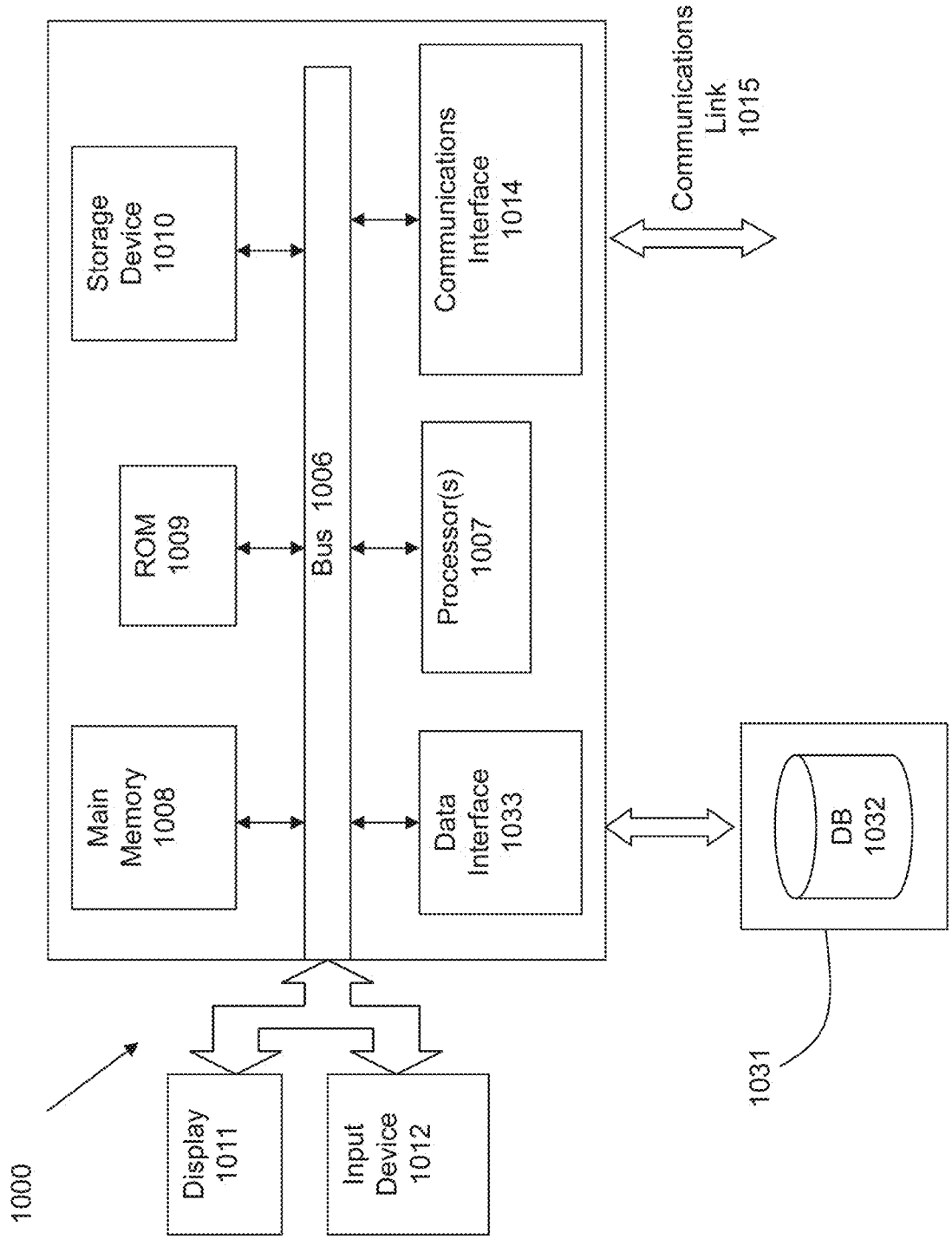
FIG. 8 is a block diagram of an illustrative computing system suitable for implementing an embodiment of the present disclosure.

FIG. 8 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 9:
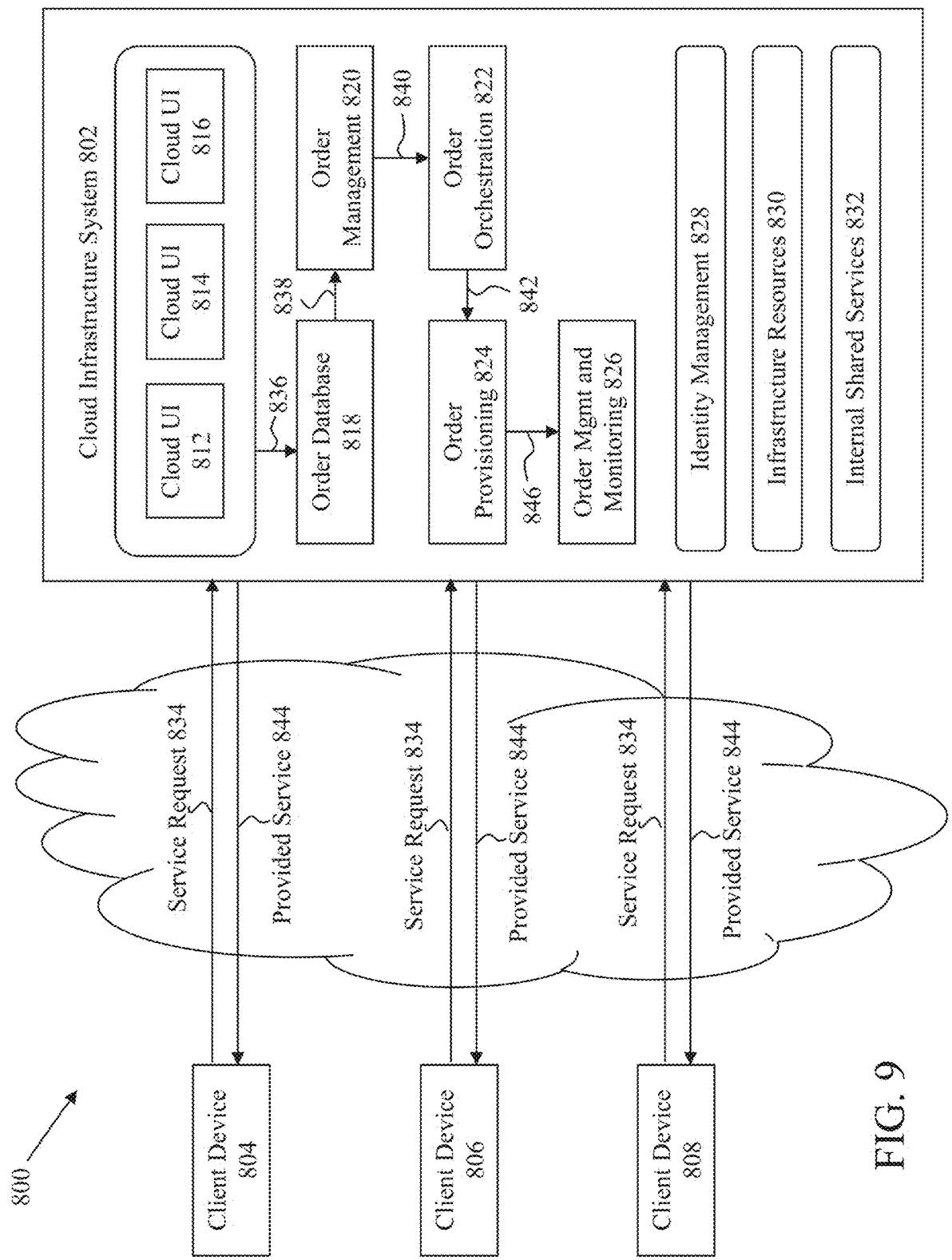
FIG. 9 is a block diagram of one or more components of a system environment by which services provided by one or more components of an embodiment system may be offered as cloud services, in accordance with an embodiment of the present disclosure.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 8. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method for performing processing of a table function, comprising:
 receiving a structured query language (SQL) statement comprising a select statement, one or more predicates for the select statement, and a table function (TF);
 identifying a definition of the TF;
 transforming the table function into a database view for a database table based at least in part upon the definition of the table function and the one or more predicates for the select statement in the SQL statement; and optimizing the SQL statement without generating respective separate cursors for each of the select statement and the TF.

2. The method of claim 1, wherein the TF comprises a polymorphic table function (PTF), and execution of SQL statement having the one or more predicates generates a separate database view of the database table, on which the SQL statement is executed, based at least in part upon the one or more predicates, the separate database view comprising the database view and at least one new column.

3. The method of claim 1, further comprising generating, for both the select statement and the TF, a single cursor comprising an execution plan, the execution plan comprising defining a view.

4. The method of claim 3, wherein no SQL cursor is created specifically for the PTF, and a single cursor is used to optimize the SQL statement comprising the select statement and the table function.

5. The method of claim 2, wherein the database view transformed from the PTF comprises a set of one or more pass-through columns generated by a database system for the database table and one or more new columns generated by execution of the PTF.

6. The method of claim 3, wherein the database view comprises a non-mergeable view.

7. The method of claim 3, wherein the TF comprises a polymorphic table function (PTF), and the database view corresponds to an input structure of the PTF.

8. The method of claim 3, wherein the TF comprises a polymorphic table function (PTF), and the database view is generated by pushing down the one or more predicates from a WHERE clause of the SQL statement, the one or more predicates filtering data from a database as input data for the PTF.

9. The method of claim 2, wherein the PTF comprises a table-semantic PTF that pertains to a state management activity and a set of rows retrieved by the PTF from the database table and transmitted between a database management system and the table-semantic PTF.

10. The method of claim 9, wherein an invocation of the PTF further comprises a partition by column that allows parallel processing of the PTF based at least in part on the partition by column, wherein information pertaining to the partition by column is specified as an input argument for the polymorphic table function.

11. The method of claim 10, wherein the SQL statement comprises the one or more predicates, and at least one predicate of the one of more predicates references the partition by column for filtering input data for the table-semantic PTF.

12. The method of claim 11, wherein the at least one predicate is pushed down to the table-semantic PTF to filter the input data for the table-semantic PTF.

13. The method of claim 2, wherein the definition comprises:
a first function describing one or more arguments of the PTF, the one or more arguments comprising an input table structure and an output table structure; and
one or more second functions for fetching data from the database table as input data for the PTF.

14. A system for performing processing of a table function, comprising:
a processor; and
a memory for holding programmable code having instructions which, when executed by the processor, causes the processor to perform a set of acts, the set of acts comprising:

receiving a structured query language (SQL) statement, the SQL statement comprising a select statement, one or more predicates for the select statement, and a table function (TF);
identifying a definition of the TF, wherein the one or more predicates of the select statement are used to reduce an input source to a reduced input source for the select statement;
transforming the table function into a database view for a database table based at least in part upon the definition of the table function and the one or more predicates for the select statement in the SQL statement; and
optimizing the SQL statement without generating respective separate cursors for each of the select statement and the TF.

15. The system of claim 14, wherein the TF comprises a polymorphic table function (PTF), and application of the one or more predicates generates a separate database view of the database table based at least in part upon the one or more predicates, the separate database view comprising the database view and at least one new column.

16. The system of claim 14, wherein the programmable code further includes instructions for generating, for both select statement and the TF, a single cursor comprising an execution plan, the execution plan comprising defining a view.

17. The system of claim 15, wherein no SQL cursor is created specifically for the PTF, and a single cursor is used to optimize execution of both the select statement and the table function.

18. The system of claim 15, wherein the programmable code further includes instructions for interpreting the PTF as a view based at least in part upon the one or more predicates that are pushed down from the select statement to the table function.

19. The system of claim 16, wherein the view comprises a non-mergeable view.

20. The system of claim 16, wherein the TF comprises a polymorphic table function (PTF), and the view corresponds to an input structure of the PTF.

21. The system of claim 16, wherein the TF comprises a polymorphic table function (PTF), the view is generated by pushing down the one or more predicates from a WHERE clause of the SQL statement to the polymorphic table function, and the one or more predicates filter data from a database table as input data for the PTF.

22. The system of claim 15, wherein the PTF comprises a table-semantic PTF that pertains to a state management activity and a set of rows retrieved by the PTF from the database table transmitted between a database management system and the table-semantic PTF.

23. The system of claim 22, wherein an invocation of the PTF further comprises a partition by column that allows parallel processing of the PTF based at least in part on the partition by column, wherein information pertaining to the partition by column is specified as an input argument for the polymorphic table function.

24. The system of claim 23, wherein the SQL statement comprises the one or more predicates, and at least one predicate of the one of more predicates references the partition by column for filtering input data for the table-semantic PTF.

25. The system of claim 24, wherein the at least one predicate is pushed down to the table-semantic PTF to filter the input data for the table-semantic PTF.

26. The system of claim 15, wherein the definition of the PTF comprises:
- a first function describing one or more arguments of the PTF, the one or more arguments comprising an input table structure and an output table structure; and
- one or more second functions for fetching data from the database table, upon which the SQL statement is executed, as input data for the PTF.

27. A computer program product embodied on a non-transitory computer readable medium having stored thereon a sequence of instructions which, when executed by a processor, causes the processor to execute a set of acts for performing processing of a table function, the set of acts comprising:
- receiving a structured query language (SQL) statement comprising a select statement, one or more predicates, and a table function (TF);
- identifying a definition of the TF;
- transforming the table function into a database view for a database table based at least in part upon the definition of the table function and the one or more predicates for the select statement in the SQL statement; and
- optimizing the SQL statement without generating respective separate cursors for each of the select statement and the TF.

28. The computer program product of claim 27, wherein the TF comprises a polymorphic table function (PTF), and application of the one or more predicates generates a separate database view of the database table, on which the SQL statement is executed, based at least in part upon the one or more predicates, the separate database view comprising the database view and at least one new column.

29. The computer program product of claim 28, wherein the set of acts further comprises generating, for the select statement and the TF, a single cursor comprising an execution plan, the execution plan comprising defining a view.

30. The computer program product of claim 28, wherein no SQL cursor is created specifically for the PTF, and a single cursor is used to optimize execution of both the select statement and the table function.

31. The computer program product of claim 28, wherein the set of acts further comprises interpreting the PTF as a view based at least in part upon the one or more predicates that are pushed down from the select statement to the table function.

32. The computer program product of claim 29, wherein the view comprises a non-mergeable view.

33. The computer program product of claim 29, wherein the view corresponds to an input structure of the PTF.

34. The computer program product of claim 29, wherein the view is generated by pushing down the one or more predicates from a WHERE clause of the SQL statement to the polymorphic table function, the one or more predicates filtering data from the database table as input data for the PTF.

35. The computer program product of claim 28, wherein the PTF comprises a table-semantic PTF that pertains to a state management activity and a set of rows retrieved by the PTF from the database table and transmitted between a database management system and the table-semantic PTF.

36. The computer program product of claim 35, wherein an invocation of the PTF further comprises a partition by column that allows parallel processing of the PTF based at least in part on the partition by column, wherein information pertaining to the partition by column is specified as an input argument for the polymorphic table function.

37. The computer program product of claim 36, wherein the SQL statement comprises the one or more predicates, and at least one predicate of the one of more predicates references the partition by column for filtering input data for the table-semantic PTF.

38. The computer program product of claim 37, wherein the at least one predicate is pushed down to the table-semantic PTF to filter the input data for the table-semantic PTF.

39. The computer program product of claim 28, wherein the definition of the PTF comprises:
- a first function describing one or more arguments of the PTF, the one or more arguments comprising an input table structure and an output table structure; and
- one or more second functions for fetching data from the database table, upon which the SQL statement is executed, as input data for the PTF.

40. A computer implemented method for performing processing of a table function, comprising:
- receiving a structured query language (SQL) statement comprising a table function (TF); and
- creating one cursor for the SQL statement without creating a specific cursor for the TF, wherein
  - the one cursor includes an execution plan, and
  - the execution plan, when executed, defines a view of an input structure for the table function and determines a new column using data that is retrieved from the view with an operator from the table function.

41. The method of claim 40, wherein the TF is a polymorphic table function (PTF).

42. The method of claim 41, wherein the one cursor comprises the execution plan that comprises defining the view on the input structure, the view comprising one or more predicates.

43. The method of claim 42, wherein the one or more predicates are identified in a WHERE clause of the SQL statement.

44. The method of claim 42, wherein the execution plan further comprising fetching, from operators implemented by code that are received from a PTF implementation package corresponding to the PTF, the data from the view to compute one or more new columns.

45. The method of claim 44, wherein the execution plan further comprising generating a data structure from pass-through columns from the input structure and the one or more new columns computed.

46. The method of claim 45, wherein the execution plan further comprising defining a second view on the data structure, the second view comprising the one or more predicates from the SQL statement that are based at least in part on the one or more new columns computed.

* * * * *

UNITED STATES PATENT AND TRADEMARK OFFICE
CERTIFICATE OF CORRECTION

PATENT NO. : 11,151,134 B2  
APPLICATION NO. : 16/007777  
DATED : October 19, 2021  
INVENTOR(S) : Chaudhry et al.

Page 1 of 1

It is certified that error appears in the above-identified patent and that said Letters Patent is hereby corrected as shown below:

In the Specification

In Column 5, Line 66, delete "PTV" and insert -- PTF --, therefor.

In Column 7, Line 44, delete "PTV" and insert -- PTF --, therefor.

In Column 11, Line 25, delete "new columns 430." and insert -- new_columns 430. --, therefor.

In Column 13, Lines 59-60, delete "pass through)," and insert -- pass-through), --, therefor.

In Column 14, Line 62, delete "function" and insert -- function. --, therefor.

In Column 19, Line 67, delete "PTSN, and insert -- PSTN, --, therefor.

In Column 22, Line 54, delete "re-allocation" and insert -- reallocation --, therefor.

In the Claims

In Column 26, Line 55, in Claim 16, after "both" insert -- the --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*